US010443208B2

(12) United States Patent
Sikora

(10) Patent No.: US 10,443,208 B2
(45) Date of Patent: Oct. 15, 2019

(54) PIVOTALLY FLEXIBLE MOUNTING INTERFACE FOR A ROTATABLE SHAFT

(71) Applicant: Vermeer Manufacturing Company, Pella, IA (US)

(72) Inventor: Tyler Sikora, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 316 days.

(21) Appl. No.: 15/354,395

(22) Filed: Nov. 17, 2016

(65) Prior Publication Data

US 2017/0159261 A1   Jun. 8, 2017

Related U.S. Application Data

(60) Provisional application No. 62/257,067, filed on Nov. 18, 2015.

(51) Int. Cl.
*E02F 5/08* (2006.01)
*E02F 3/22* (2006.01)
(Continued)

(52) U.S. Cl.
CPC ............... *E02F 3/22* (2013.01); *E02F 3/183* (2013.01); *E02F 3/24* (2013.01); *E02F 5/08* (2013.01);
(Continued)

(58) Field of Classification Search
CPC ..... E02F 3/20; E02F 3/188; E02F 3/24; E02F 3/22; E02F 3/962; E02F 3/303;
(Continued)

(56) References Cited

U.S. PATENT DOCUMENTS 1,316,903 A   9/1919  Kuentzel
1,424,051 A   7/1922  Wayne
(Continued)

FOREIGN PATENT DOCUMENTS

DE   2920074 A1   11/1980
EP   2559864 A2   2/2013
(Continued)

OTHER PUBLICATIONS

Jack et al., "Experimenting with the Java Computer Language in Engineering Calculations: Application to Statically Intedeterminate, Rigid, Multi-Bearing Shaft Analysis," International Journal of Soft Computing and Engineering, ISSN: 2231-2307, vol. 3, Issue 3, Jul. 2013 (17 pgs).
(Continued)

*Primary Examiner* — Robert E Pezzuto
(74) *Attorney, Agent, or Firm* — Armstrong Teasdale LLP

(57) ABSTRACT

A pivotally flexible motor mount for a rotary trenching tool allows for increased life of the overall system. A flexible motor mount includes a universal pivot arrangement that allows a motor housing to universally pivot relative to a boom to accommodate misalignment between a motor shaft axis and a rock wheel rotation axis. The flexible motor mount also includes a first pair of spherical connection joints aligned along a first pivot axis and a second pair of spherical connection joints aligned along a second pivot axis. The first and second pivot axes are generally perpendicular relative to one another. The flexible motor mount further includes a component mounting plate attached to the motor housing and an intermediate plate coupled to the component mounting plate by the first pair of spherical connection joints. The intermediate plate is also coupled to the boom by the second pair of spherical connection joints.

18 Claims, 18 Drawing Sheets

(51) Int. Cl.
*E02F 3/18* (2006.01)
*H02K 5/26* (2006.01)
*E02F 3/24* (2006.01)
*E02F 5/14* (2006.01)
*F16C 35/02* (2006.01)
*F16C 23/04* (2006.01)

(52) U.S. Cl.
CPC ............... *E02F 5/14* (2013.01); *F16C 35/02* (2013.01); *H02K 5/26* (2013.01); *E02F 3/188* (2013.01); *F16C 23/045* (2013.01); *F16C 2350/26* (2013.01)

(58) Field of Classification Search
CPC ..... E02F 3/183; E02F 5/08; E02F 5/30; E02F 9/2866; E02F 3/26; E02F 5/14; F16C 35/02; F16D 3/56; F16D 3/70; F16D 3/72; F16D 3/62; H02K 5/26
USPC ........ 37/95, 189, 91–94; 172/195; 299/39.3, 299/15, 72, 75, 37.4, 69, 1.5
See application file for complete search history.

(56) References Cited

U.S. PATENT DOCUMENTS

| | | | |
|---|---|---|---|
| 1,636,692 A | 7/1927 | Hill | |
| 1,752,138 A | 3/1930 | Ainsworth | |
| 1,894,507 A | 1/1933 | Ainsworth | |
| 2,292,675 A | 8/1942 | Thiry | |
| 2,633,719 A * | 4/1953 | Riopelle | F16D 3/78 464/71 |
| 2,837,901 A | 6/1958 | Chapman | |
| 3,257,826 A | 6/1966 | Peterson | |
| 3,304,743 A * | 2/1967 | Paulsen | F16D 3/70 464/137 |
| 3,356,529 A | 12/1967 | Kiser et al. | |
| 3,561,336 A * | 2/1971 | Century | E02D 3/074 404/133.2 |
| 4,040,270 A | 8/1977 | Chivari | |
| 4,051,784 A | 10/1977 | Ries | |
| 4,230,372 A | 10/1980 | Marten | |
| 4,575,358 A | 3/1986 | Ferris | |
| 4,588,388 A | 5/1986 | Chivari | |
| 4,729,753 A * | 3/1988 | Neathery | B64C 27/35 416/102 |
| 4,804,352 A | 2/1989 | Schmidt | |
| 4,897,073 A | 1/1990 | Chivari | |
| 5,186,686 A | 2/1993 | Staples et al. | |
| 5,484,339 A | 1/1996 | Birioukov et al. | |
| 5,526,590 A * | 6/1996 | Palm | E02D 3/026 172/40 |
| 7,104,510 B2 | 9/2006 | Beller | |
| 7,552,883 B2 | 6/2009 | Kinnunen et al. | |
| 7,641,557 B2 | 1/2010 | Bartlett | |
| 8,257,051 B2 | 9/2012 | Stamps et al. | |
| 8,375,605 B2 * | 2/2013 | Ruhl | E02F 3/183 37/91 |
| 8,529,358 B2 | 9/2013 | Koenig et al. | |
| 2002/0195869 A1 | 12/2002 | Dybsetter | |
| 2010/0278465 A1 | 11/2010 | Klusman et al. | |

FOREIGN PATENT DOCUMENTS

| | | |
|---|---|---|
| FR | 1457431 A | 1/1966 |
| FR | 2732377 A1 | 10/1996 |
| GB | 781797 A | 8/1957 |
| WO | 97/16606 A1 | 5/1997 |

OTHER PUBLICATIONS

European Search Report for EP16199385 dated Mar. 10, 2017 (8 pgs).

* cited by examiner

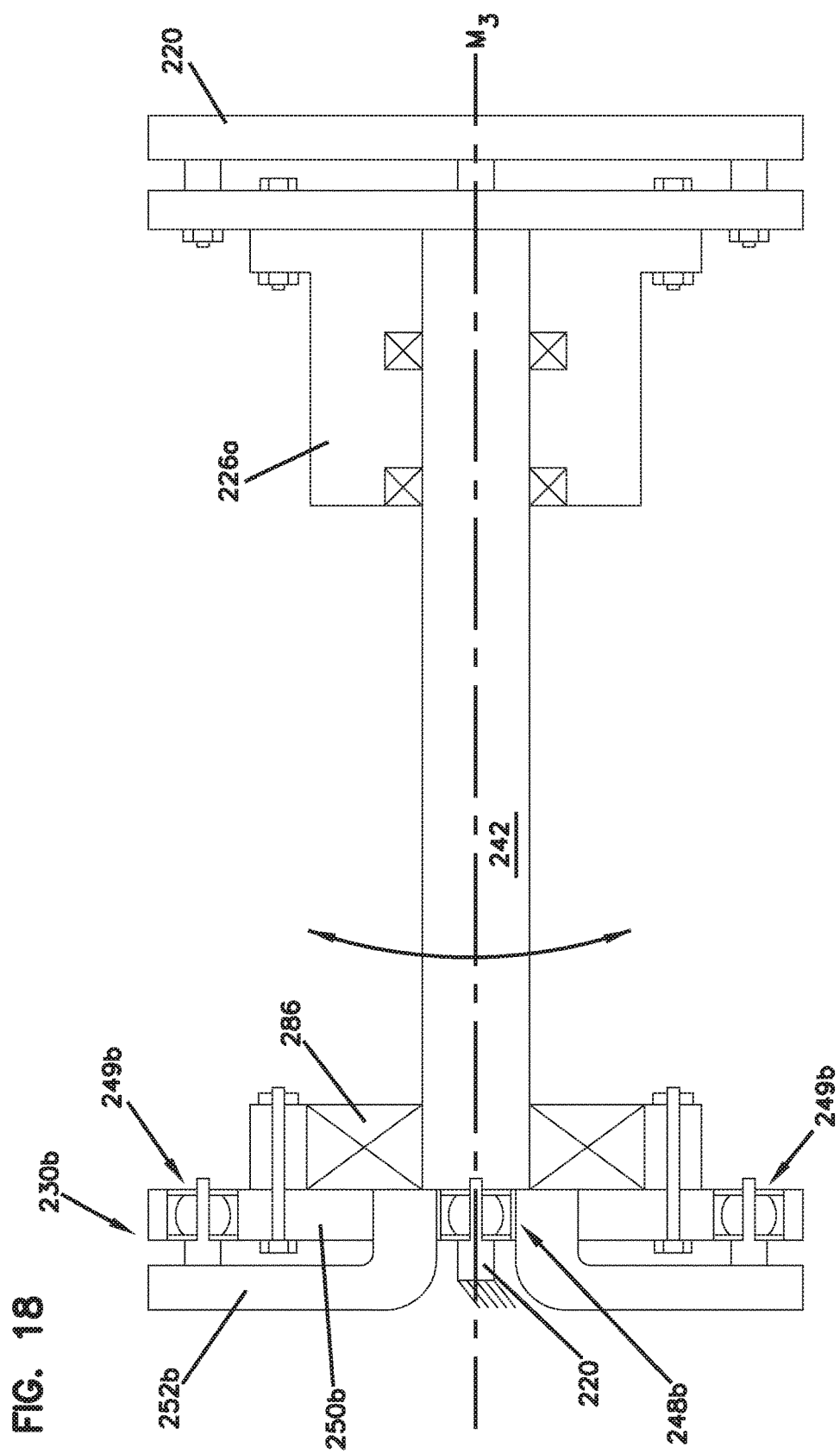

PIVOTALLY FLEXIBLE MOUNTING INTERFACE FOR A ROTATABLE SHAFT

CROSS-REFERENCE TO RELATED APPLICATION

The present patent application claims the benefit of U.S. Provisional Patent Application Ser. No. 62/257,067, filed Nov. 18, 2015, which application is hereby incorporated by reference in its entirety.

BACKGROUND

Off-road excavation machines are commonly used to efficiently provide a number of different excavation related functions. An example type of excavation machine is a trencher. Trenchers are typically used to excavate trenches for use in installing utilities such as underground pipe or conduit for cable. A trencher generally includes a chassis supported on a propulsion system having ground engaging tracks or tires. A trenching boom is pivotally connected to the chassis and is pivotally movable relative to the chassis between a raised transport position and a lowered trenching position. For excavating trenches in rocky or hard packed ground, a rotatable rock wheel may, in one embodiment, be mounted to the trenching boom. The rock wheel includes a plurality of excavating teeth positioned around the wheel's outer periphery.

To power the rotation of the rock wheel, a motor, or a pair of motors, is attached directly to the rock wheel. Each motor is then attached to the boom. However, when fixing the motors to the boom, the input shafts of each motor and the rotational shaft of the rock wheel are difficult to align. When the input shafts are misaligned with the rock wheel rotational shaft, indeterminate static loading can result in loading conditions where the various components of the system are subjected to excessive loads. More generally, such an issue arises when attempting to mount a rotating shaft to fixed structures while also attempting to align the shaft to prevent excessing loading within the associated system. Schematic examples are shown in FIGS. 1A and 1B.

As shown, input shafts 10 are mounted to a rotating structure 12. Each input shaft 10 is supported in a motor housing 14 which are each secured to a fixed frame structure 16 at sides A and B, respectively. As shown in FIG. 1A, the input shaft 10 mounted at side A is supported in the motor housing 14 by a pair of bearings 18, while the input shaft 10 mounted at side B is supported in the motor housing 14 by a single bearing 18. Because side B is skewed with respect to the side A, the single bearing 18 at side B must either 1) move so as to align its centerline with an axis of rotation X of the input shaft 10; or 2) the motor housing 14 must move so as to align the axis of rotation X of the input shaft 10 with the centerline of the bearing 18. Conversely, FIG. 1B shows two bearings 18 supporting the input shaft 10 at side B. When compared to the example shown in FIG. 1A, the bearings 18 in FIG. 1B cannot be repositioned along the input shaft 10 so as to perfectly align the axis of rotation X of the input shaft 10 within the centerlines of the bearings 18. Therefore, this example is said to be statically indeterminate as it provides a situation where the resulting loads on the components of the mounting system are not possible to calculate without defining certain properties of components in the system, such as the stiffness of the frame 16 and the motor housing 14.

Because both of the examples shown in FIGS. 1A and 1B show a motor housing 14 fixedly secured to the frame structure 16, movement of the motor housings 14 is not possible, nor feasible. Because of this, indeterminate static loading is created which results in loading conditions where the various components of the system are subjected to excessive loads. These loads that can fluctuate as a function of the rotational position of the rotating structure 12. Additionally, the loads are created by the amount of misalignment of the sides A and B of the frame 16 and also can be a function of the rigidity of the frame 16 and the amount of misalignment of the sides A and B of the frame 16. The components of the system that are affected include the bearings 18, the motor housing 14, and the frame 16 and such loading can lead to failure of such components.

Therefore, improvements in mounting such motors are needed.

SUMMARY

The present disclosure relates generally to a pivotally flexible mounting interface for a rotatable shaft. In one possible configuration, the pivotally flexible mounting interface could be a motor mount for a rotary driven tool, which, for example, may take the form of a rotary trenching tool. In another possible configuration, and by non-limiting example, a flexible mounting interface allows the motor to move about the frame to which it is mounted.

In a first aspect of the present disclosure, a trenching device that is adapted for attachment to a vehicle is disclosed. The trenching device includes a boom that is configured to be pivotally attached to the vehicle by a connection that allows the boom to be pivoted between raised and lowered positions. The boom has first and second fixed mount flanges. The trenching device also includes a first motor and a second motor. Each motor has a motor housing mounted to the respective first and second fixed mount flange of the boom via a pivotally flexible mounting interface. Each motor also has a drive shaft rotatably mounted within the motor housing. Further, each drive shaft defines a motor axis, and each motor includes a rotary mount flange. The trenching device also includes a rotary trenching tool that has a tool axis and is mounted on a first side to the rotary mount flange of the first motor and on a second side to the rotary mount flange of the second motor. The rotary trenching tool is also operably connected to the drive shaft. The pivotally flexible mounting interfaces used to mount the first and second motors to the first and second fixed mount flanges of the boom each respectively include universal pivot arrangements. The universal pivot arrangements are configured to allow the respective motor housings to move so as align the motor axis of a corresponding motor with the tool axis of the rotary trenching tool.

In a second aspect of the present disclosure, a trenching device that is adapted for attachment to a vehicle is disclosed. The trenching device includes a boom that is configured to be pivotally attached to the vehicle by a connection that allows the boom to be pivoted between raised and lowered positions. The boom has a fixed mount flange. The trenching device also includes a motor that has a motor housing mounted to the fixed mount flange of the boom via a pivotally flexible mounting interface. The motor has a drive shaft rotatably mounted within the motor housing. The drive shaft defines a motor axis, and the motor also includes a rotary mount flange. The trenching device also includes a rotary trenching tool that has a tool axis and is mounted at a first side to the rotary mount flange of the motor. The rotary trenching tool is also operably connected to the drive shaft. The pivotally flexible mounting interface used to mount the motor to the fixed mount flange of the boom includes universal pivot arrangements, the universal pivot arrangements being configured to allow the motor housing to move so as align the motor axis with the tool axis of the rotary trenching tool.

In a third aspect of the present disclosure, a trenching device that is adapted for attachment to a vehicle is disclosed. The trenching device includes a boom that is configured to be pivotally attached to the vehicle by a connection that allows the boom to be pivoted between raised and lowered positions. The boom has a fixed mount flange. The trenching device further includes a shaft that is mounted to the fixed mount flange of the boom via a pivotally flexible mounting interface. The shaft is rotatably mounted relative to a structural component by a plurality of shaft bearings. The shaft defines a shaft axis, and the shaft further has a rock wheel mounting flange. The trenching device also includes a rock wheel rotatable relative to the boom about a rock wheel rotation axis. The rock wheel is attached at a first major side to the rock wheel mounting flange such that the rock wheel rotates with the shaft. The rock wheel further has an outer periphery that extends around the rock wheel rotation axis that includes a plurality of excavating teeth mounted thereto. The pivotally flexible mounting interface includes a universal pivot arrangement. The universal pivot arrangement is configured to allow the structural component to universally pivot relative to the boom to accommodate misalignment between the shaft axis and the rock wheel rotation axis. The universal pivot arrangement includes a first pair of spherical connection joints aligned along a first pivot axis and a second pair of spherical connection joints aligned along a second pivot axis. The first and second pivot axes are generally perpendicular relative to one another. The flexible mounting interface further includes a component mounting plate and an intermediate plate. The component mounting plate is attached to the structural component, and the intermediate plate is coupled to the component mounting plate by the first pair of spherical connection joints. The intermediate plate is also coupled to the boom by the second pair of spherical connection joints.

In a fourth aspect of the present disclosure, a rotary apparatus is disclosed. The driven rotary apparatus includes a carrier that defines a fixed mount flange. The driven rotary apparatus also includes a motor that has a motor housing mounted to the fixed mount flange via a pivotally flexible mounting interface. The motor includes a drive shaft rotatably mounted within the motor housing. The drive shaft defines a motor axis and the motor also includes a rotary mount flange. The driven rotary apparatus includes a rotary component having a component axis. The rotary component is mounted at a first side to the rotary mount flange of the motor. The rotary component is operably connected to the drive shaft. Further, the pivotally flexible mounting interface used to mount the motor to the fixed mount flange includes spherical connection joints. The spherical connection joints are configured to allow the motor housing to move so as align the motor axis with the component axis of the rotary component.

In a fifth aspect of the present disclosure, a rotary apparatus is disclosed. The rotary apparatus includes a carrier that defines a fixed mount flange. The rotary apparatus includes a support structure mounted to the fixed mount flange via a pivotally flexible mounting interface. The support structure includes a shaft rotatably mounted within the support structure and the shaft defines a shaft axis. The pivotally flexible mounting interface used to mount the support structure to the fixed mount flange includes spherical connection joints, the spherical connection joints being moveably connected to the support structure and to the fixed mount flange, the spherical connection joints further allowing the support structure to move with respect to the fixed mount flange.

In a sixth aspect of the present disclosure, a rotary apparatus is disclosed. The rotary apparatus includes a carrier that defines a fixed mount flange. The rotary apparatus includes a support structure mounted to the fixed mount flange via a pivotally flexible mounting interface. The pivotally flexible mounting interface includes a support structure mounting plate rigidly mounted to, or part of, the support structure. The pivotally flexible mounting interface also includes a an intermediate mounting plate. The support structure mounting plate is pivotally flexibly mounted to the intermediate mounting plate at a first spherical plain bearing that has a first center, and at a second spherical plain bearing that has a second center so that the support mounting plate is free to pivot about a first mount axis. The intermediate mounting plate is pivotally flexibly mounted to the fixed mount flange at a third spherical plain bearing that has a third center, and at a fourth spherical plain bearing that has a fourth center so that the intermediate mounting plate is free to pivot about a second mount axis that is transverse the first mount axis A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 18 illustrates a schematic example of a pivotally flexible mounting interface for a rotatable shaft mounted to a bearing.

DETAILED DESCRIPTION

Figure 1A:
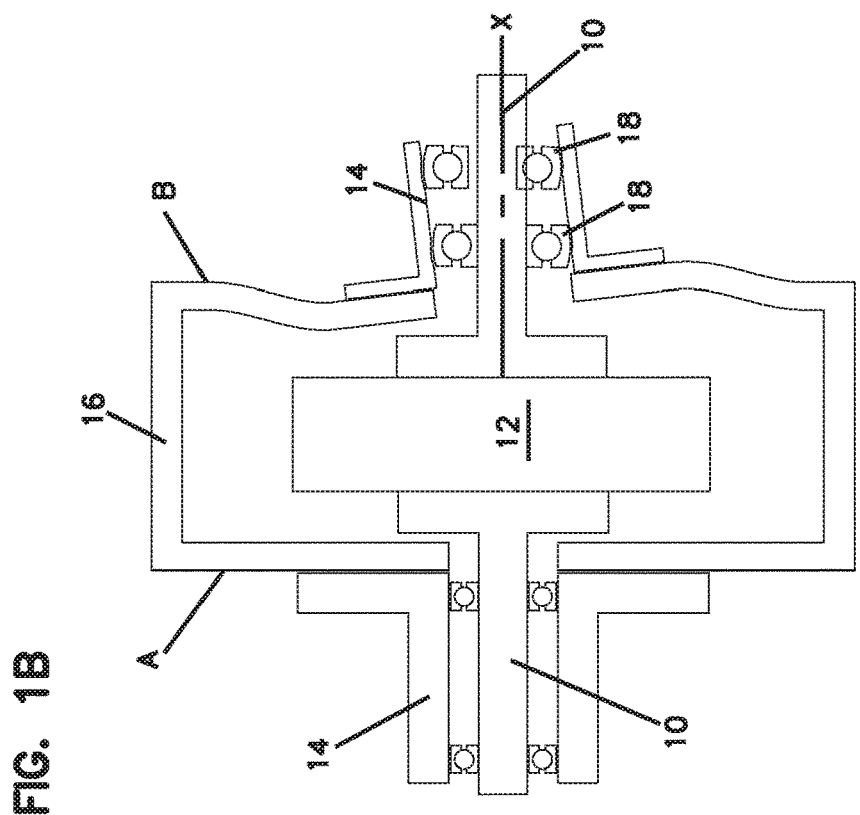
FIGS. 1A and 1B illustrate prior art schematic examples of example motor mounts.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The system disclosed herein generally relates to a mounting system that includes a pivotally flexible mounting interface for a rotatable shaft. More specifically, and in one embodiment of the present disclosure, a motor mount disclosed herein has the advantage of improving the life of the driven rotary system by reducing stress on the components of the system and more closely aligning the input shaft of the motor with the rotational axis of the rotating member, which, in one illustrated embodiment, is a rock wheel. This also allows the frame to which the motor mount is attached to be a lower precision part.

Figure 2:
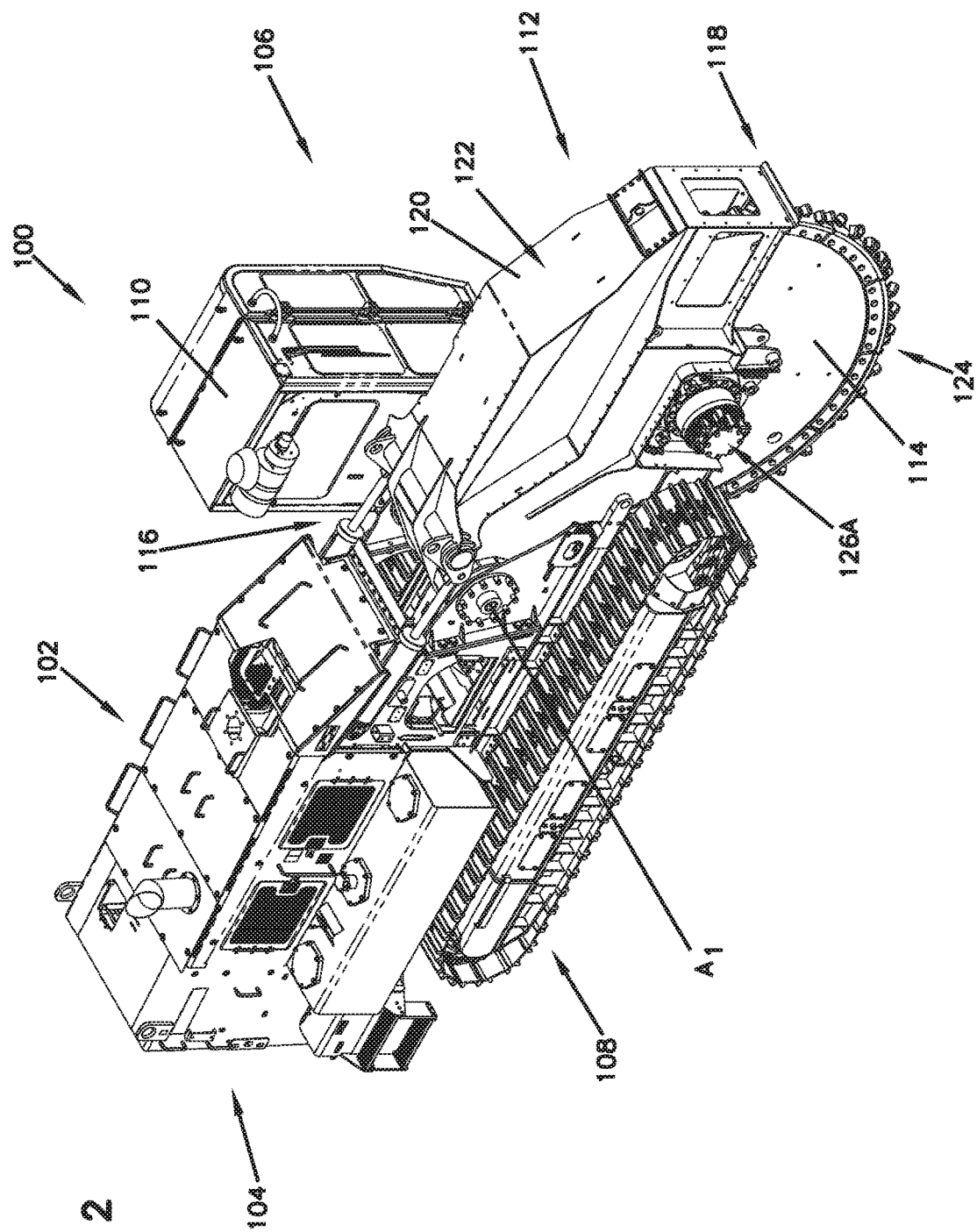
FIG. 2 illustrates a perspective view of an example trencher according to one embodiment of the present disclosure.
Figure 3:
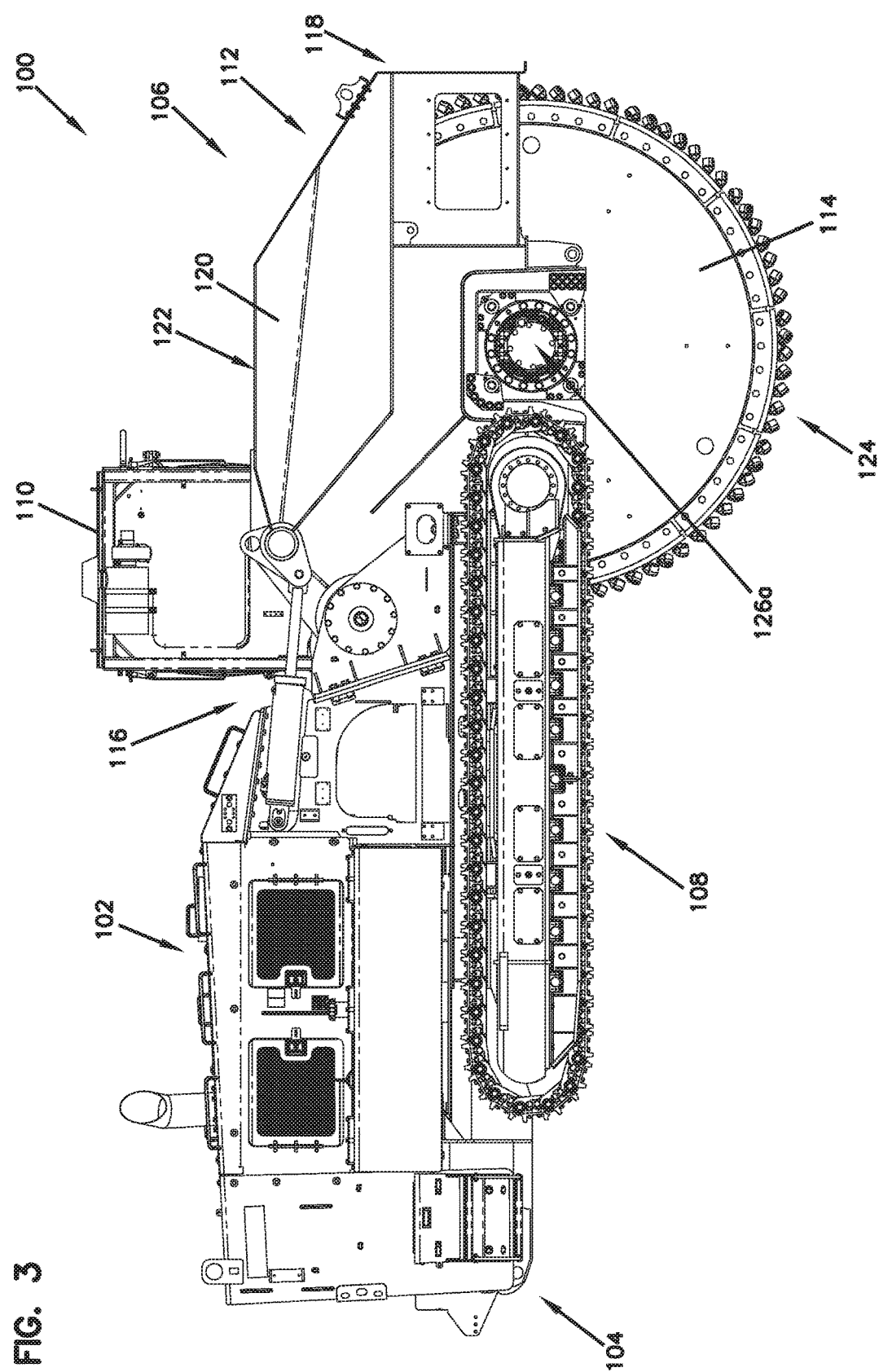
FIG. 3 illustrates a side view of the trencher of FIG. 2.
Figure 4:
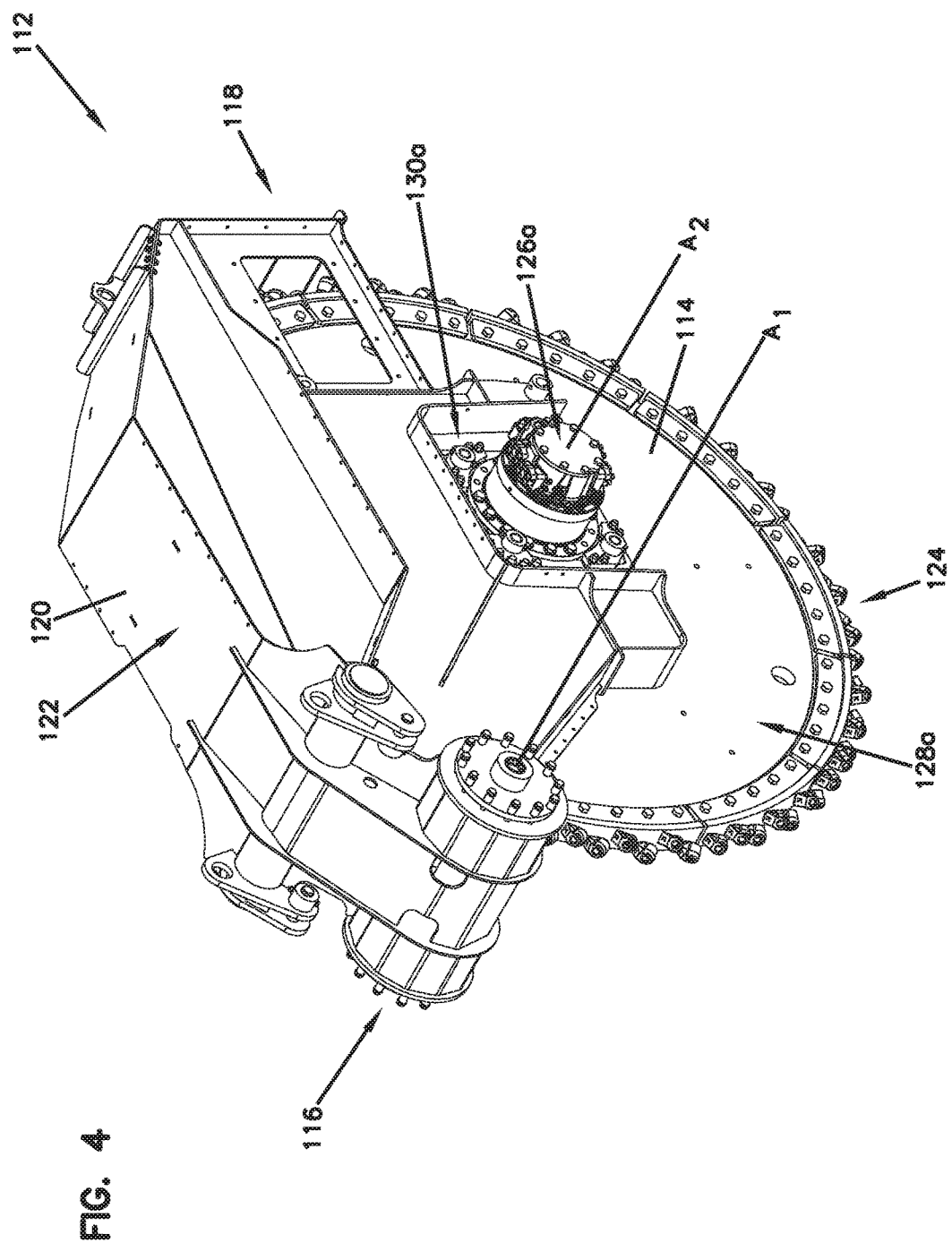
FIG. 4 illustrates a perspective view of a boom of the trencher of FIG. 2.
Figure 5:
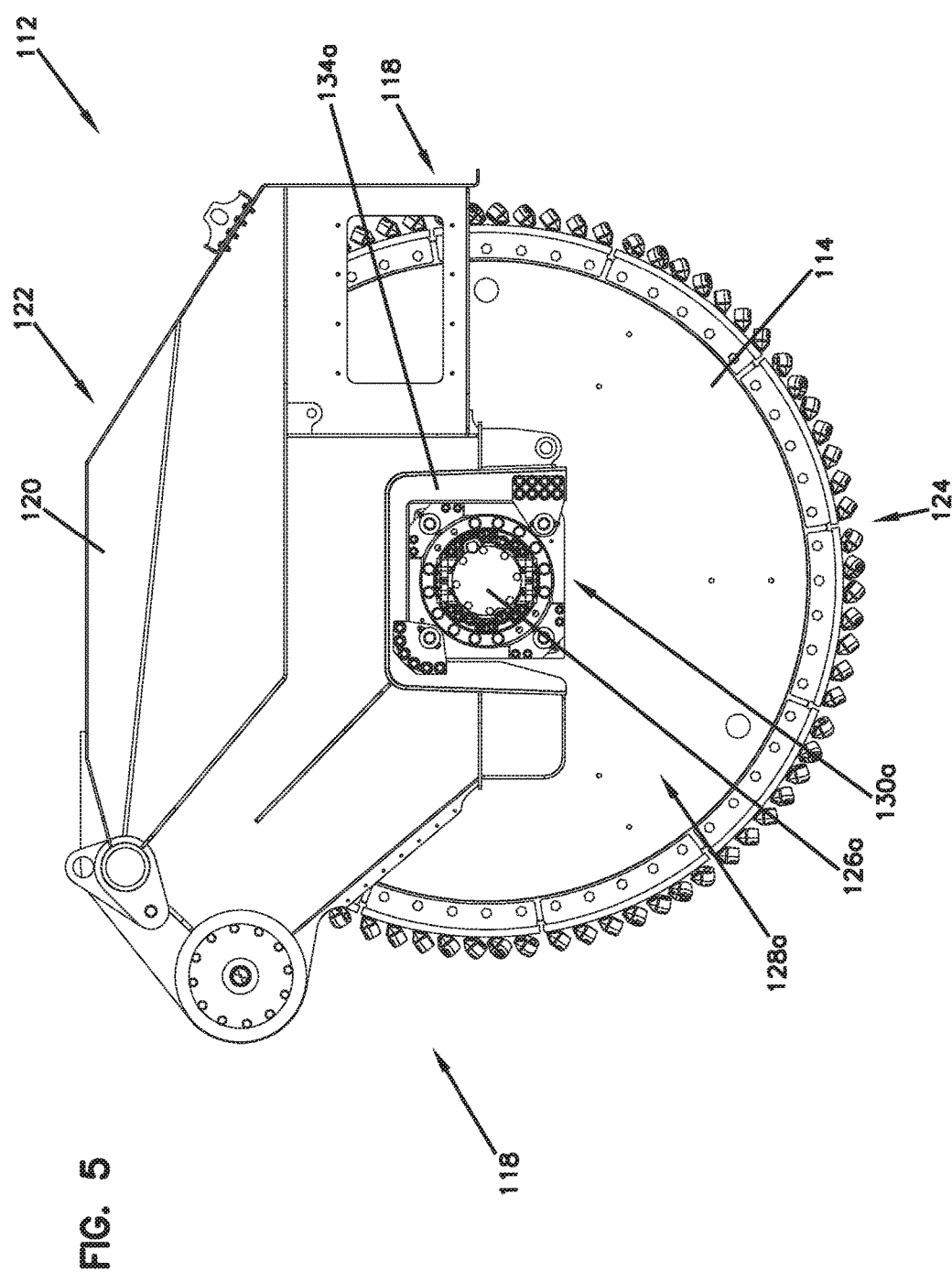
FIG. 5 illustrates a side view of the boom of FIG. 4.
Figure 6:
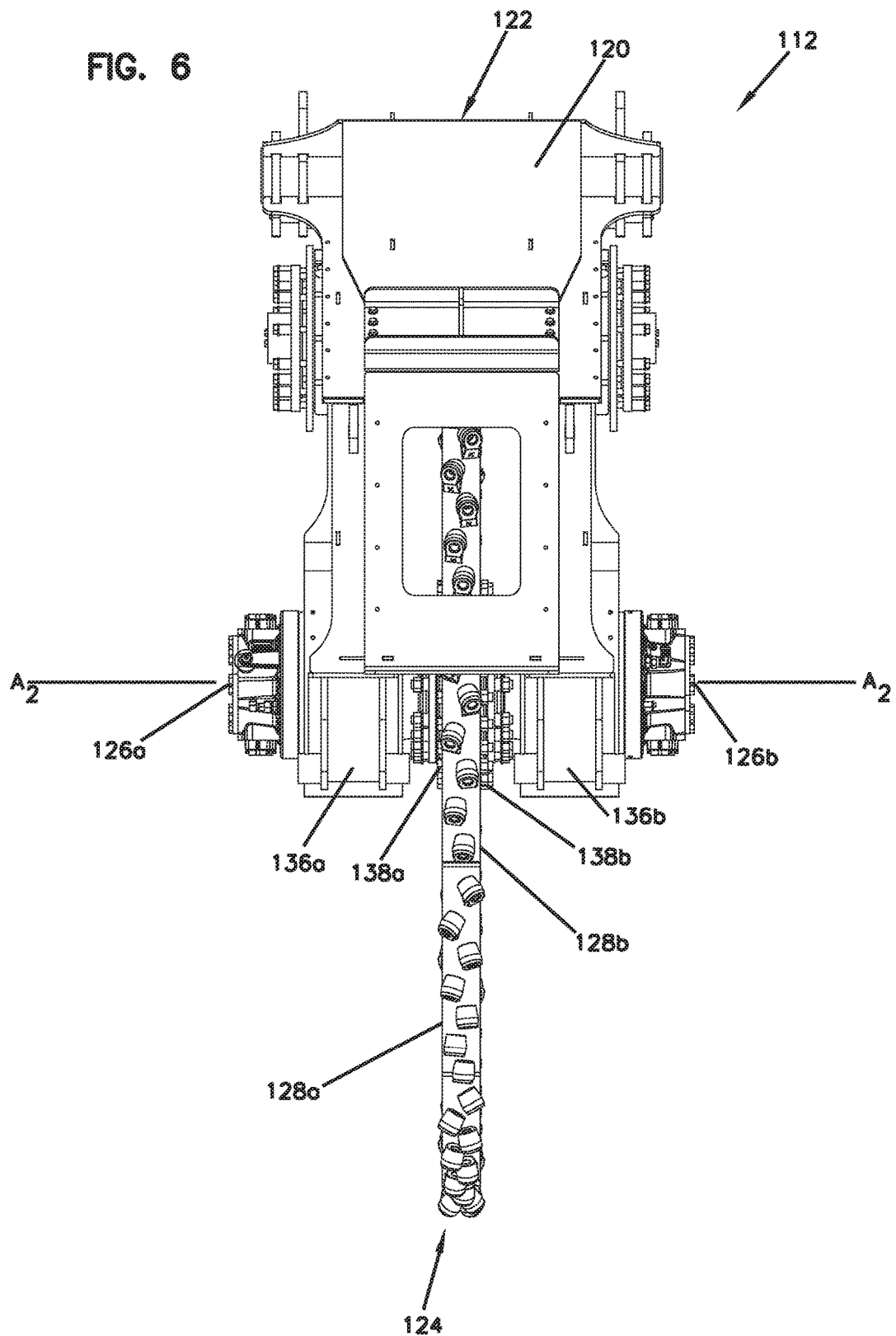
FIG. 6 illustrates a rear view of the boom of FIG. 4.
Figure 7:
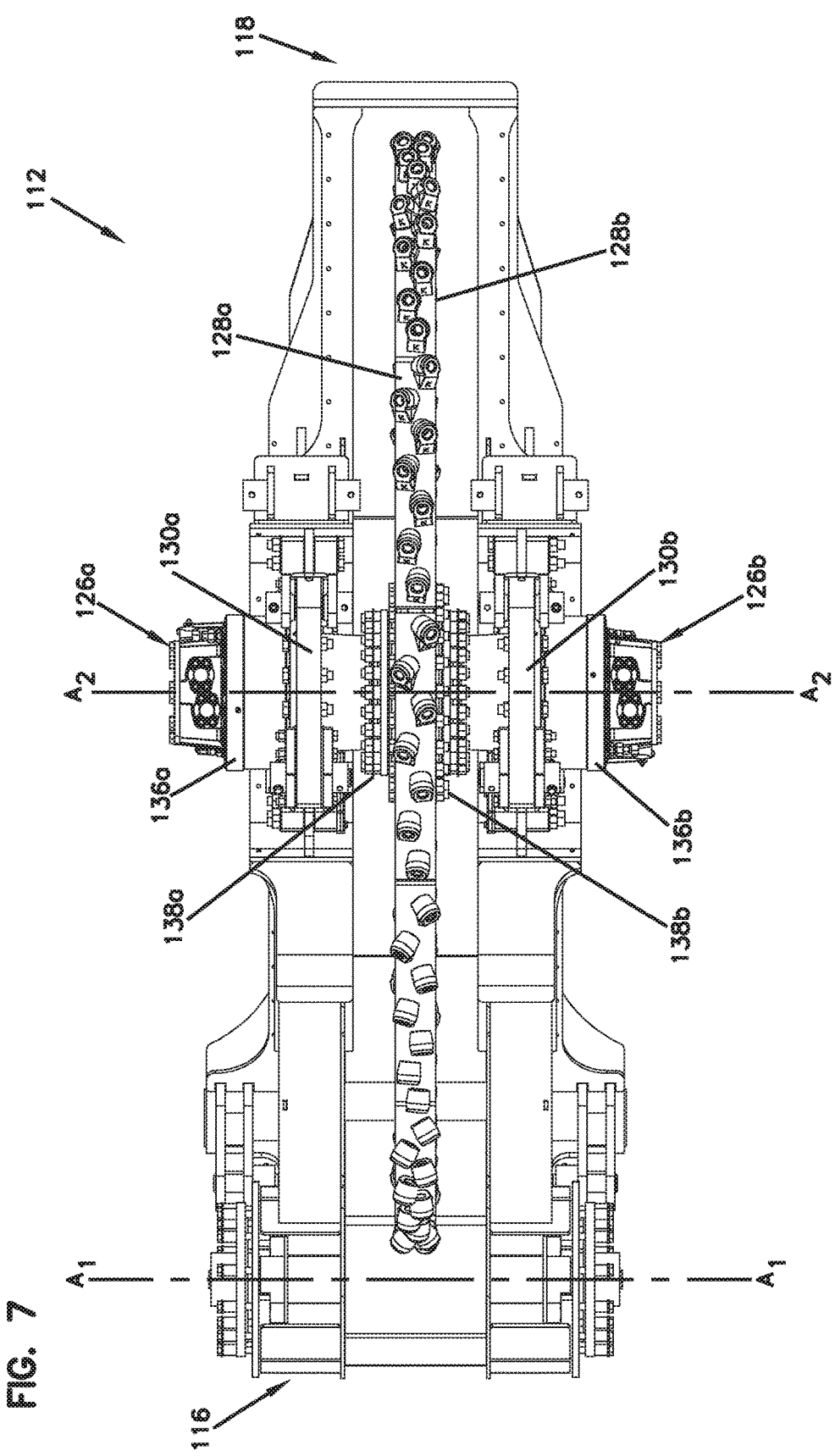
FIG. 7 illustrates a bottom view of the boom of FIG. 4.

According to one embodiment of the present disclosure, a trencher, or trenching machine, 100 is shown in FIGS. 2-3. The depicted trencher 100 has a chassis 102 with a front or forward end 104 and a back or rear end 106. The trencher 100 has a propulsion system 108 for moving the chassis 102 selectably forward and rearward along a direction of travel. The propulsion system 108 can include tracks, as depicted, or tires (not shown) as would be understood by one of ordinary skill in the art. The trencher 100 also includes an operator's cab 110 mounted to the chassis 102.

Further, the trencher 100 has a trencher boom 112 mounted to the back or rear end 106 of the chassis 102. The trencher boom 112 is pivotally movable relative to the chassis 102 between a raised position and a lowered position. The boom 112 rotates about axis A1 between the raised position and lowered position. Mounted to the boom 112 is a rotary trenching tool 114. In the depicted embodiment, the rotary trenching tool 114 is a rock wheel.

As depicted, the example trencher boom 112 has a proximal end 116 that is pivotally mounted to the chassis 102 according to methods understood by one of ordinary skill in the art. Opposite the proximal end 116, the trencher boom 112 has a distal free end 118. The trencher boom 112 has a boom frame 120 that extends longitudinally along the length of the boom 112. The trencher boom 112 has a top side 122 and a bottom side 124.

FIGS. 4-7 show the trenching boom 112 detached from the trencher 100. The frame 120 of the boom 112 is shown at least partially covering the rock wheel 114. The rock wheel 114 is rotatable about the frame 120 about a rock wheel rotation axis A2. Additionally, the frame 120 of the boom 112 provides mounting support for the rock wheel 114. Specifically, a pair of motors 126a, 126b is mounted to first and second sides 128a, 128b of the rock wheel 114. The motors 126a, 126b are then mounted to the frame 120 by way of pivotally flexible mounting interfaces 130a, 130b.

The rock wheel 114 is a metal disc that includes a plurality of teeth 132 positioned around the outer circumference of the rock wheel 114. As the rock wheel 114 is rotated by the motors 126a, 126b, the teeth 132 dig away at a rocky or hard packed surface, resulting in a narrow trench.

The frame 120 of the boom 112 includes frame mounting surfaces 134a, 134b to mount the motors 126a, 126b. The frame 120, in the illustrated embodiment, is a weldment and is therefore constructed by welding a variety of pieces of metal together. It is to be understood that, in other variations, the frame portions could be held together, additionally or alternatively, via mechanical fasteners, brazing, etc., and still be within the scope of the present system.

The motors 126a, 126b control the rotation of the rock wheel 114. In some embodiments, the motors 126a, 126b are hydraulic motors in fluid communication with a hydraulic system of the trencher 100. An example motor is a MS83 multipurpose motor manufactured by Poclain Hydraulics. In other embodiments, the motors 126a, 126b are electric motors. In still other embodiments, the motors 126a, 126b are gear box drives driven by hydraulic motors. In more general terms, the motors can be a support for a rotating shaft. Also, generally, the motor can be any prime mover that rotates a shaft.

Figure 10:
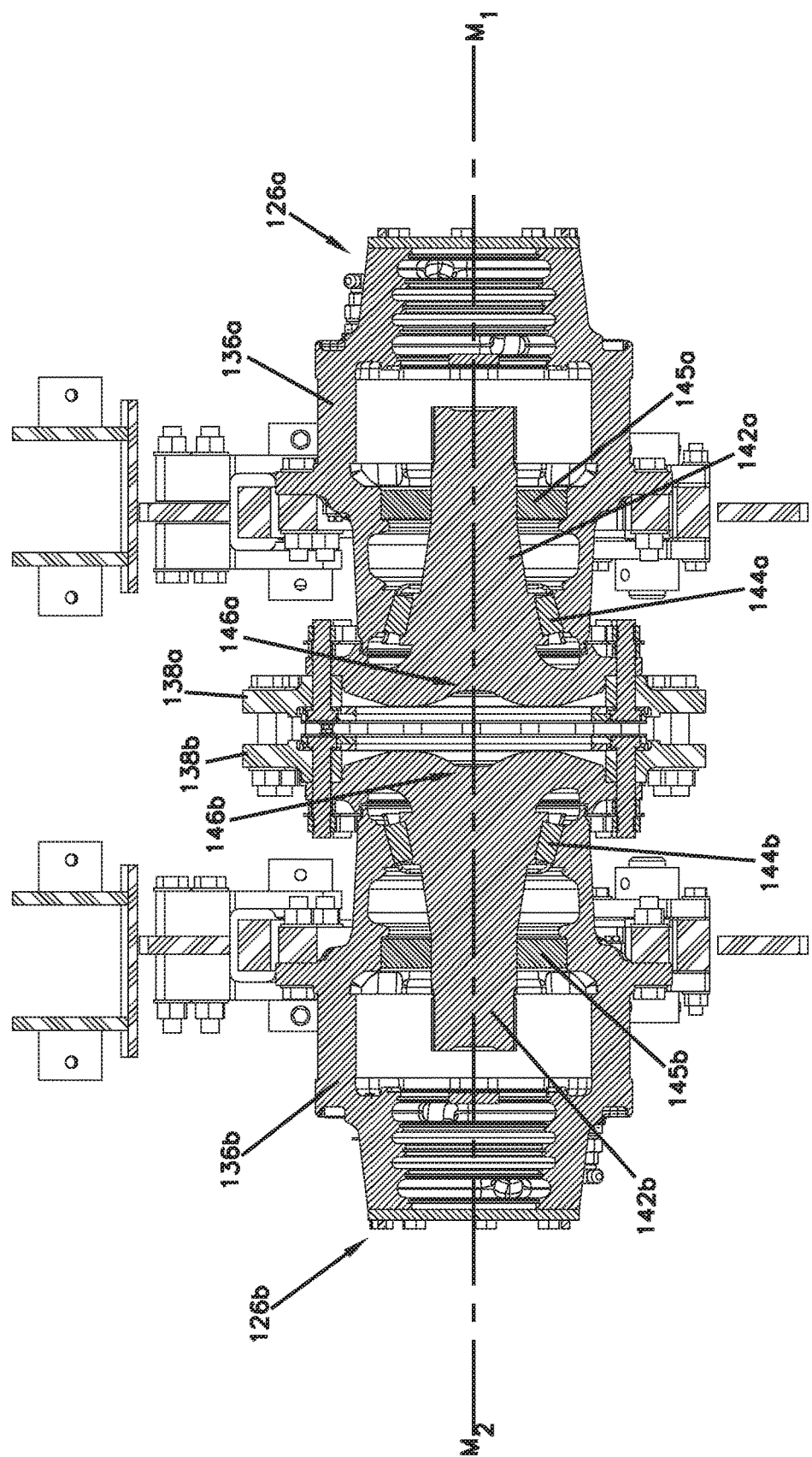
FIG. 10 illustrates a cross-section view of the motor mounting system along line 10-10.

Further, the motors 126a, 126b are controlled by the control system of the trencher 100, allowing the user to control the speed, torque, etc., of the rock wheel 114. Each motor 126a, 126b includes a motor housing 136a, 136b and a rotary mounting flange 138a, 138b. As shown in FIGS. 4-7, the rotary mounting flanges 138a, 138b are fixedly mounted to the first and second sides 128a, 128b of the rock wheel 114 using a plurality of fasteners. The rotatory mounting flanges 138a, 138b rotate as the motors 126a, 126b are operated, thereby simultaneously rotating and transferring torque to the rock wheel 114. As shown in FIG. 10, the rotary mounting flanges 138a, 138b are attached to internal drive shafts 142a, 142b of the motors 126a, 126b.

Figure 17:
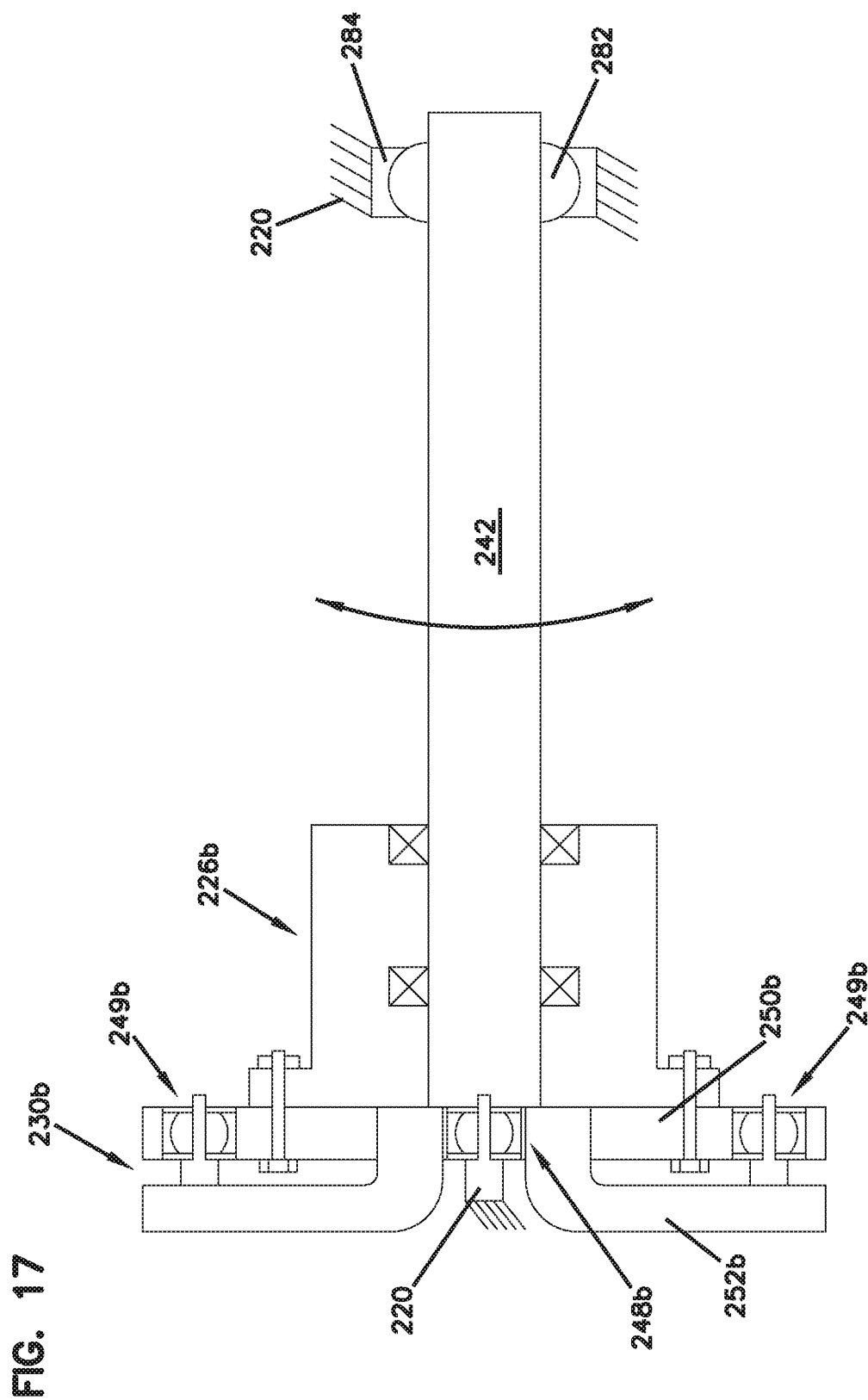
FIG. 17 illustrates a schematic example of a single pivotally flexible mounting interface for a rotatable shaft.

FIGS. 8-11 show the motors 126a, 126b, the pivotally flexible mounting interfaces 130a, 130b, and the frame mounting surfaces 134a, 134b. The rock wheel 114 is not shown; however, it is appreciated that it would be mounted to, and between the rotary mounting flanges 138a, 138b. In some embodiments, the frame mounting surfaces 134a, 134b are integral to the frame 120 and not separate portions of the frame 120. While the pair of motors 126a, 126b is shown, a single motor 126a assembly can also be utilized with a bearing assembly mounted to the side of the rock wheel 114 opposite of the single motor (as shown in FIG. 17).

Figure 8:
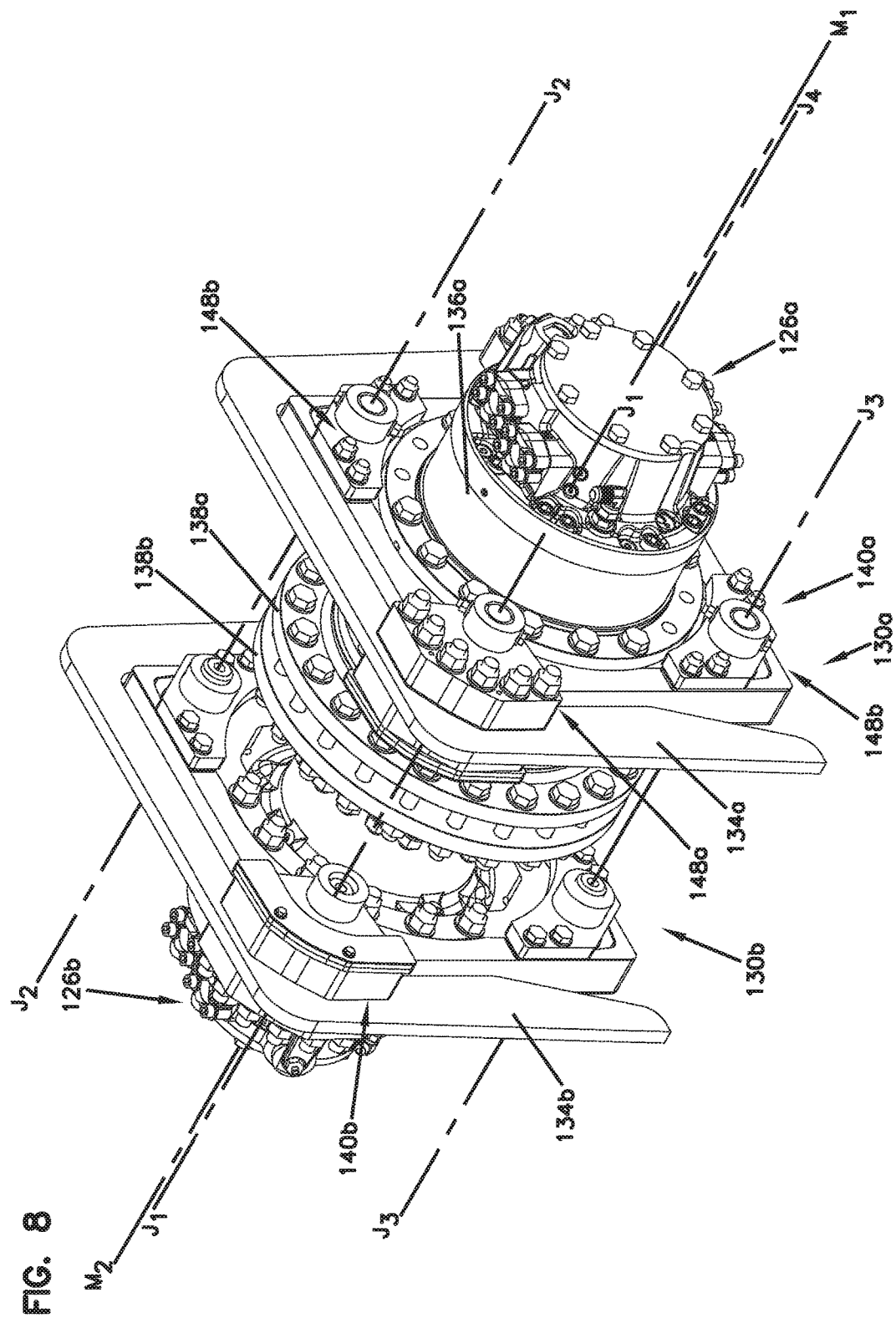
FIG. 8 illustrates a motor mounting system for a rotary trenching tool according to one embodiment of the present disclosure.
Figure 9:
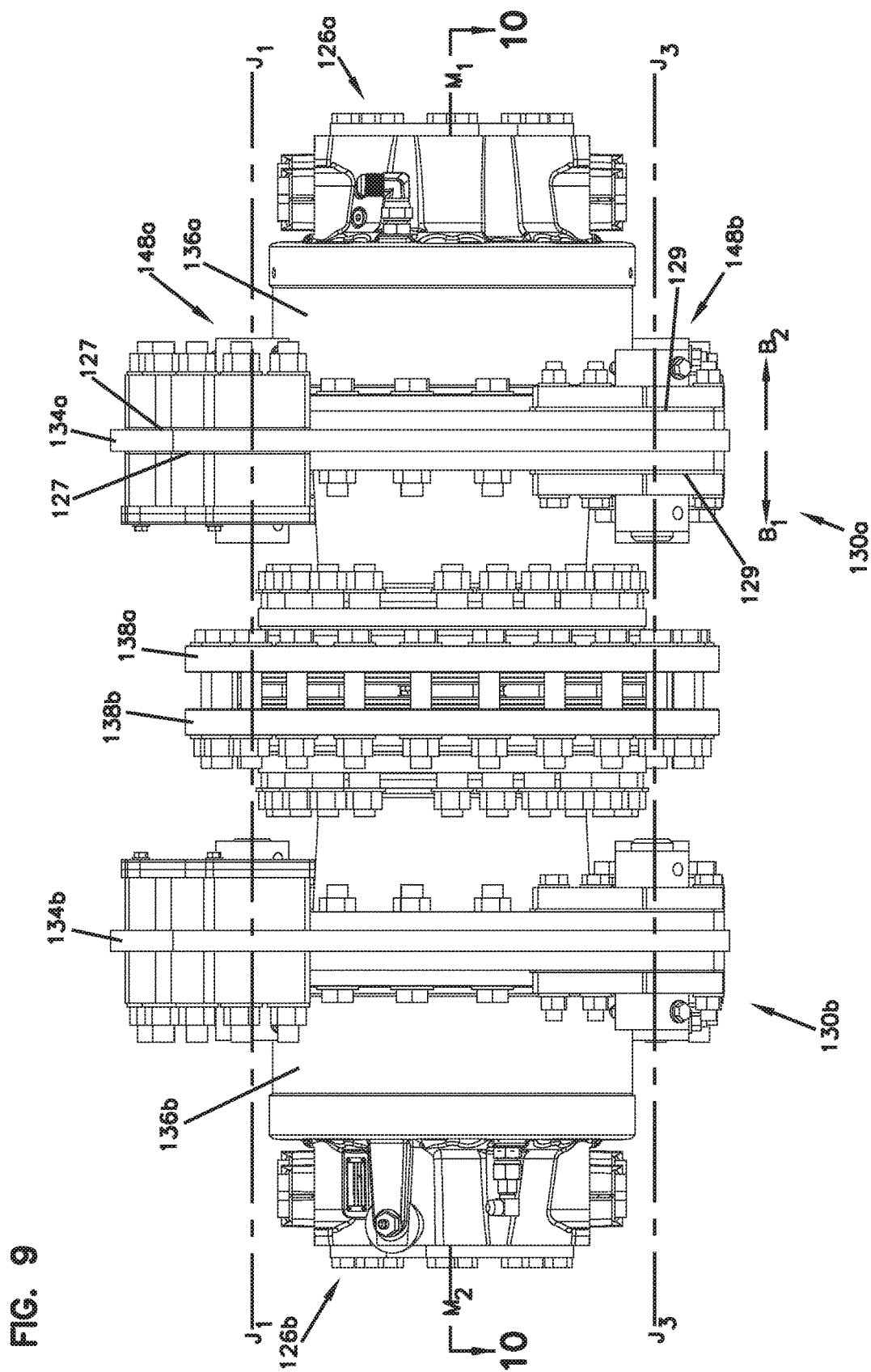
FIG. 9 illustrates a side view of the motor mounting system of FIG. 8.

FIG. 9 shows a side view of the system shown in FIG. 8. In the depicted embodiment, while both motors 126a, 126b are substantially similar, motor 126a is configured to be able to move in axial directions B1 and B2. Such movement is permitted to account for axial loading (along axes M1, M2) in the system. The movement of the motor 126a is possible due to spacers 127, 129 positioned in the flexible mounting interface 130a. Axial movement of the motor 126a will be discussed in more detail with respect to FIGS. 13-14.

As shown in the cross section of FIG. 10, the internal drive shafts 142a, 142b of the motors 126a, 126b are positioned within the motor housings 136a, 136b. In the depicted embodiment, the drive shafts 142a, 142b have a conical shape. Additionally, the drive shafts 142a, 142b define rotational axes M1 and M2 of the motors 126a, 126b. For each motor 126a, 126b, at least two internal bearings 144a/145a and 144b/145b are positioned within the motor housings 136a, 136b to support each drive shaft 142a, 142b. Because each drive shaft 142a, 142b is fixed to the rotary mounting flanges 138a, 138b at first ends 146a, 146b, any force exerted along the length of the drive shafts 142a, 142b away from the fixed first ends 146a, 146b also exerts a force within any bearing located on the drive shafts 142a, 142b. By minimizing the force exerted on each internal bearing 144a/145a, 144b/145b by each drive shaft 142a, 142b, the longer the life of the bearing; and, therefore, the longer the motor can operate between servicing and/or replacement.

Additionally, when forces are applied to the drive shafts 142a, 142b, the drive shafts 142a, 142b will move slightly, causing radial runout within the motors. The movement of the drive shafts 142a, 142b changes the positioning of the rotational axes M1, M2 of the each motor 126a, 126b. Ideally, the rotational axes M1, M2 of both motors 126a, 126b are aligned with the rotational axis A2 of the rock wheel 114. Such alignment, in addition to minimizing the issues discussed above, also promotes more efficient transfer of energy to the rock wheel 114.

Figure 1B:
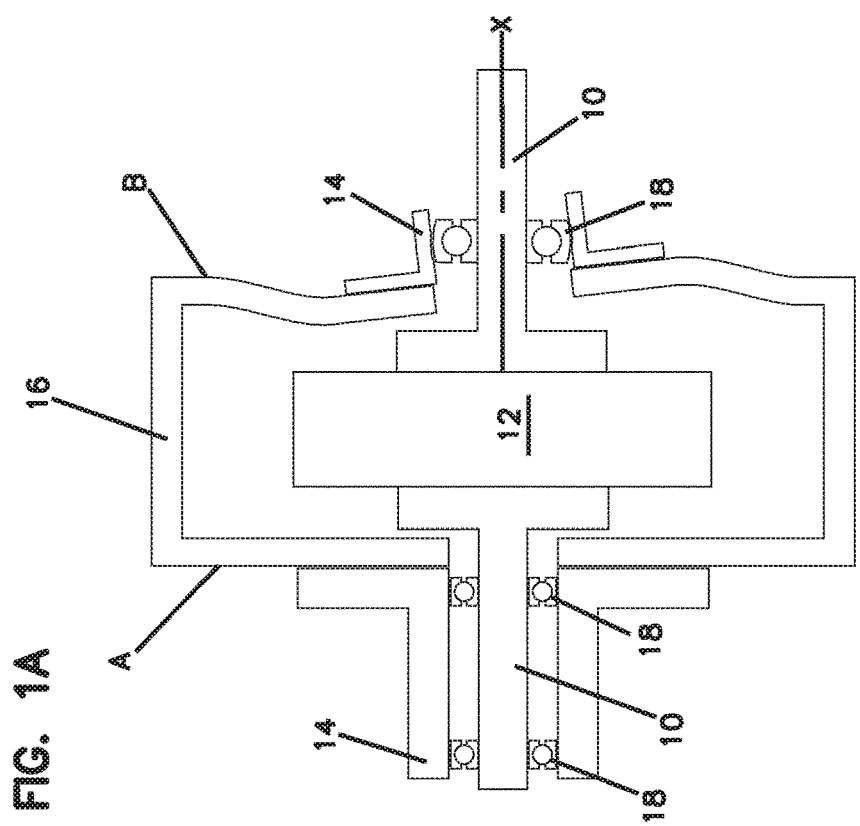

Because each drive shaft 142a, 142b is mounted within the motor housing 136a, 136b, the mounting of the motor housings 136a, 136b to surfaces that cause forces to be exerted on the drive shafts 142a, 142b can decrease the life of the internal bearings. Because the frame 120 is a weldment, the frame mounting surfaces 134a, 134b are constructed with lower precision, which can lead to misalignment of the frame mounting surfaces 134a, 134b, causing them to be non-parallel or skewed with respect to each other to at least some degree. Such a situation presents a problem when trying to fixedly mount the motors 126a, 126b to the frame 120 while also trying to ensure the rotational axes M1, M2 of both motors 126a, 126b are aligned with the rotational axis A2 of the rock wheel 114. This problem is noted and described above with respect to FIGS. 1A and 1B.

To avoid this issue, the pivotally flexible mounting interfaces 130a, 130b include universal pivot arrangements 140a, 140b that allow the motor housings 136a, 136b to move, or float, with respect to the frame mounting surfaces 134a, 134b. Such movement allows the motor housings 136a, 136b to move/pivot so as to at least reduce loads on the drive shafts 142a, 142b, reduce loads at the mounting locations on the mounting surfaces 134a, 134b, and more closely align the rotational axis M1, M2 with the rotational axis A2 of the rock wheel 114. Additionally, the movement reduces loading on the drive shafts 142a, 142b caused, for example, by 1) radial runout in the motors 126a, 126b*;* 2) differences in tolerances in mounting surfaces 134a, 134b; and 3) differences in tolerances produced during manufacturing.

Figure 11:
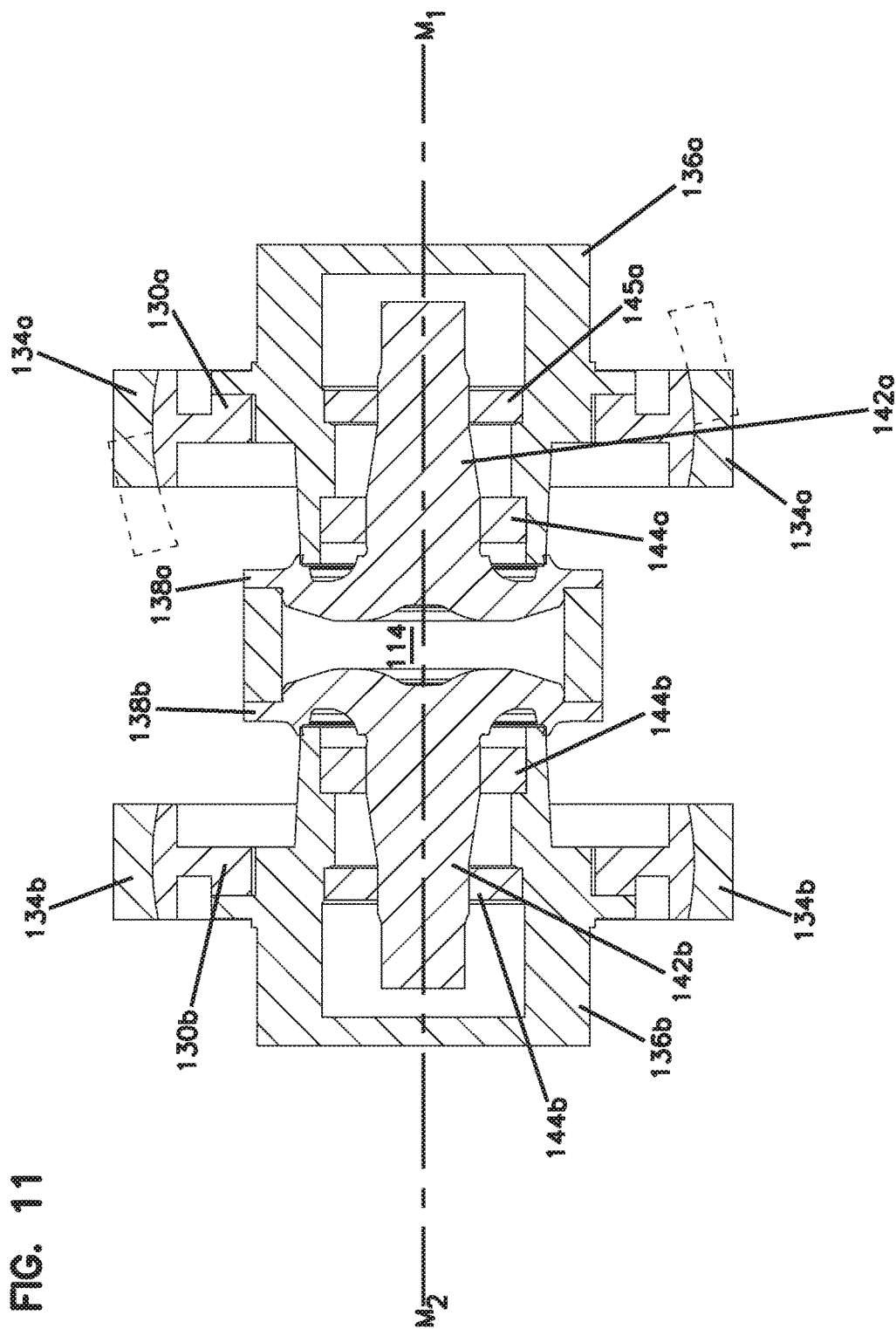
FIG. 11 illustrates a schematic example of the motor mounting system of FIG. 8.

An example of the pivotally flexible mounting interfaces 130a, 130b is shown schematically in FIG. 11. As shown, the flexible mounting interfaces 130a, 130b are fixedly secured to the motor housing 136a, 136b and also pivotally secured to the frame mounting surfaces 134a, 134b. Because the flexible mounting interfaces 130a, 130b are fixedly attached to the motor housings 136a, 136b, the flexible mounting interfaces 130a, 130b allow the motor housings 136a, 136b, and therefore all motor components, to move/pivot with respect to the frame mounting surfaces 134a, 134b. Such movement allows for the alignment of the axis of rotation of each motor M1, M2 with the centerline of each bearing 144a/144b, 145a/145b, even when the frame mounting surfaces 134a, 134b are not parallel (such an instance is shown by dashed lines). As shown, each bearing 144a/144b, 145a/145b is fixed within each motor housing 136a, 136b. Therefore, moving the motor housings 136a, 136b moves the bearings 144a/144b, 145a/145b, creating a statically determinate system. Without such movement when the frame mounting surfaces 134a, 134b are misaligned, excessive loads would occur on the frame 120, motor housings 126a, 126b and within the bearings 144a/144b, 145a/145b, similar to the example described above with respect to FIG. 1B.

Referring back to FIG. 8, the universal pivot arrangements 140a, 140b of the pivotally flexible mounting interfaces 130a, 130b each include a plurality of spherical connection joints 148. Each spherical connection joint 148 allows for angular rotation about a central point in two orthogonal directions. Additionally, as shown, each spherical connection joint 148 of the flexible mounting interface 130a is generally aligned along joint axes J1, J2, J3, and J4, with the corresponding spherical connection joint 148 of the flexible mounting interface 130b. Once mounted to the frame mounting surface 134a, 134b, and depending on the positioning of each frame mounting surface, the spherical connection joints 148 will remain generally aligned along J1, J2, J3, and J4; however, they may not be precisely collinear due to the adjustability of the flexible mounting interfaces 130a, 130b to counteract for the misalignment in the frame mounting surfaces 134a, 134b. Such general alignment will still allow the pivotally flexible mounting interfaces 130a, 130b to effectively reduce excessive loads in the system.

Figure 12:
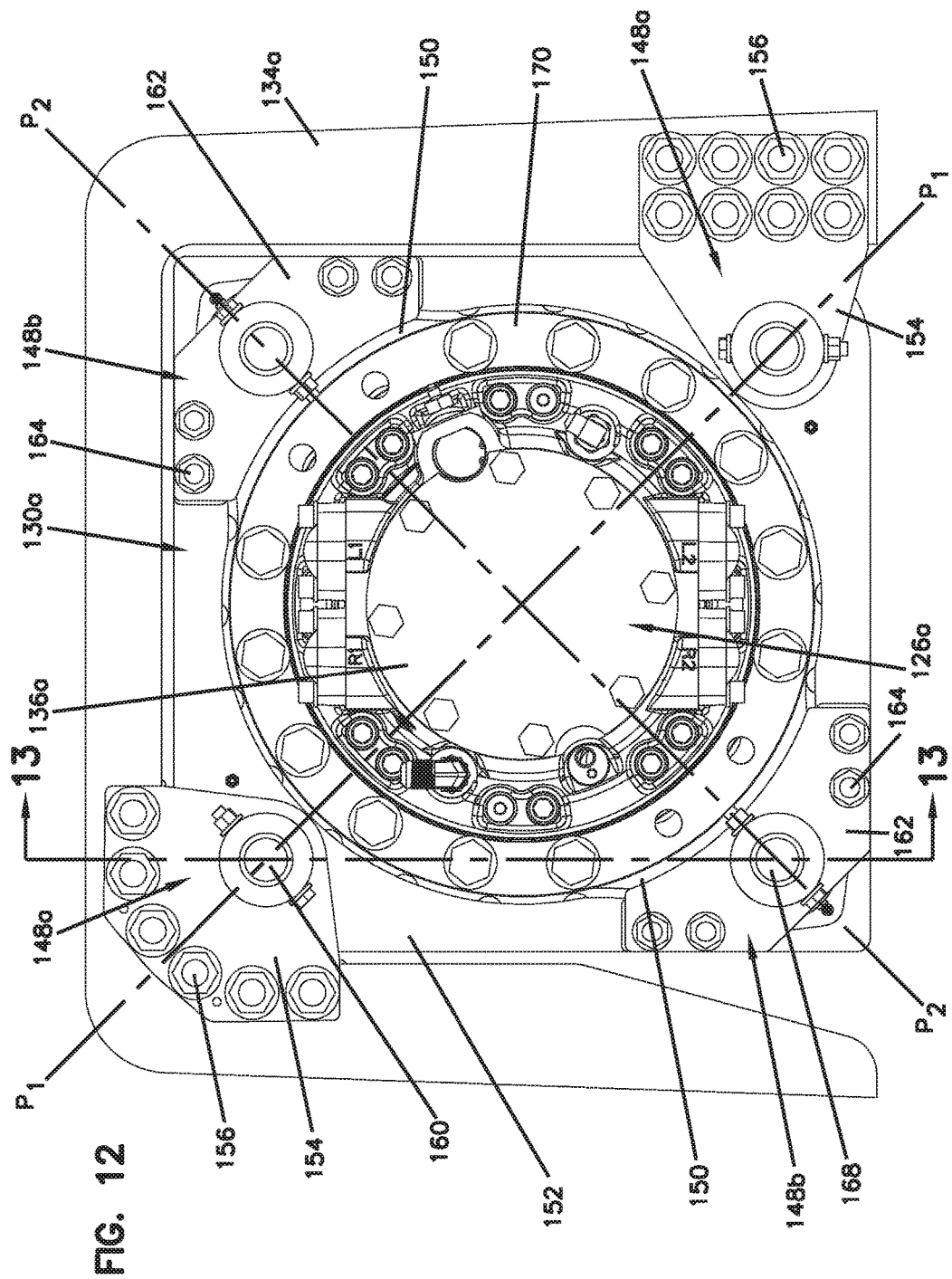
FIG. 12 illustrates a side view of the motor mounting system of FIG. 8.

Referring now to FIG. 12, the front of the motor 126a, the flexible mounting interface 130a, and the frame mounting surface 134a are shown. The motor 126b, flexible mounting interface 130b, and frame mounting surface 134b are substantially similar and therefore will not be described. The flexible mounting interface 130a includes the spherical connection joints 148, a motor mounting plate 150, and an intermediate plate 152.

The spherical connection joints 148 are positioned around the outside of the motor 126a. The spherical connection joints 148 are also positioned in pairs that include first and second pairs 148a, 148b, respectively. The first pair of spherical connection joints 148a is aligned along first pivot axis P1, and the second pair of spherical connection joints 148b is aligned along second pivot axis P2. The first and second pivot axes P1, P2 are generally perpendicular relative to one another.

Figure 13:
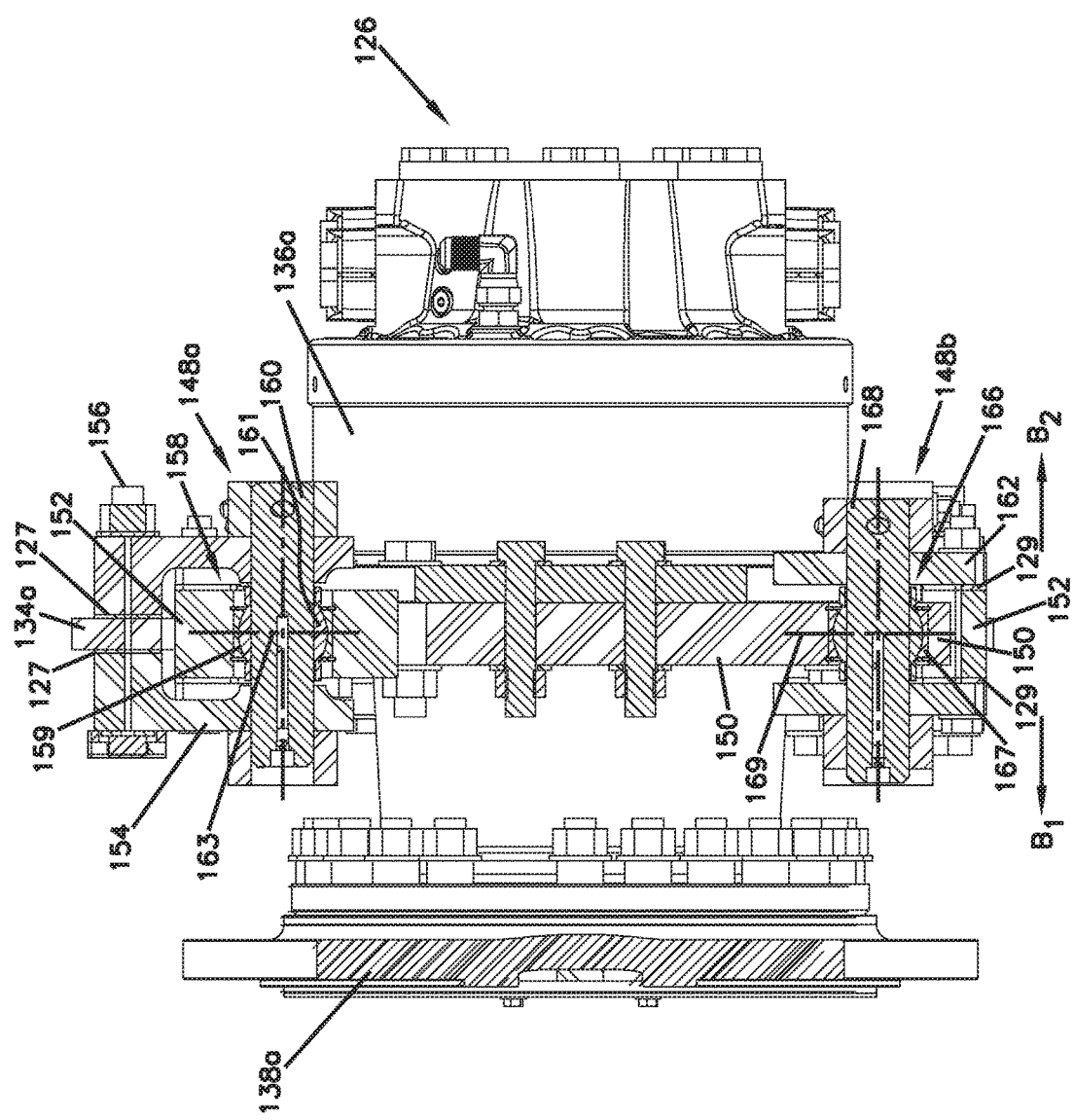
FIG. 13 illustrates a cross-section view of the motor mounting system along line 13-13.

The first pair of spherical connection joints 148a includes mounting blocks 154 that are configured to mount the frame mounting surface 134a to the intermediate plate 152 using a plurality of fasteners 156. As shown in FIG. 13, the first pair of spherical connection joints 148a each includes a respective bearing 158 that is positioned within, and connected to, the intermediate plate 152. In the depicted embodiment, the bearing 158 is a spherical plain bearing 158 that has an inner race 161 with a sphered convex outside diameter and an outer race 159 with a correspondingly sphered but concave inside surface. The bearing 158 further includes a center 163. Specifically, the outer race 159 of the bearing 158 is secured to the intermediate plate 152. A bearing pin 160 is attached to the mounting block 154 and positioned within the bearing 158. Specifically, the bearing pin 160 is mounted to the inner race 161 of the bearing 158. This allows the intermediate plate 152 to move about the bearing pin 160 via the bearing 158 and about pivot axis P1. Because the bearing pin 160 is secured to the mounting block 154 and the mounting block 154 is secured to the frame mounting surface 134a, the intermediate plate 152 can move with respect to the frame mounting surface 134a about pivot axis P1.

The second pair of spherical connection joints 148b also includes a set of mounting blocks 162 that are configured to mount the intermediate plate 152 to the motor mounting plate 150 using a plurality of fasteners 164. As shown in FIG. 13, like the first pair of spherical connection joints 148a, the second pair of spherical connection joints 148b each includes a respective bearing 166. The bearing 166 is positioned within, and connected to, the motor mounting plate 150. In the depicted embodiment, the bearing 166 is a spherical plain bearing that has an inner race 169 with a sphered convex outside diameter and an outer race 167 with a correspondingly sphered but concave inside surface. The bearing 158 further includes a center 165. Specifically, the outer race 167 of the bearing 166 is secured to the motor mounting plate 150. A bearing pin 168 is attached to the mounting block 162 and positioned within the bearing 166. Specifically, the bearing pin 168 is mounted to the inner race 169 of the bearing 166. This allows the motor mounting plate 150 to move/pivot about the bearing pin 168 via the bearing 166 and about a pivot axis P2. Because the bearing pin 168 is secured to the mounting block 162 and the mounting block 162 is secured to the intermediate plate 152, the motor mounting plate 150 can move with respect to the intermediate plate 152 about pivot axis P2.

The motor mounting plate 150 is further attached to the motor housing 136a via a motor mounting plate flange 170. Therefore, because the axes P1 and P2 are perpendicular and the motor 126a is fixed to the rock wheel 114 at the rotary mounting flange 138a, the motor 126a is able to move/pivot so as to find center, thereby reducing loads on the components of the overall system. Further, due to the axes P1 and P2 being perpendicular, the flexible mounting interface 130a provides resistance to torque produced by the drive shaft 142a of the motor 126a on the rock wheel 114.

Figure 14:
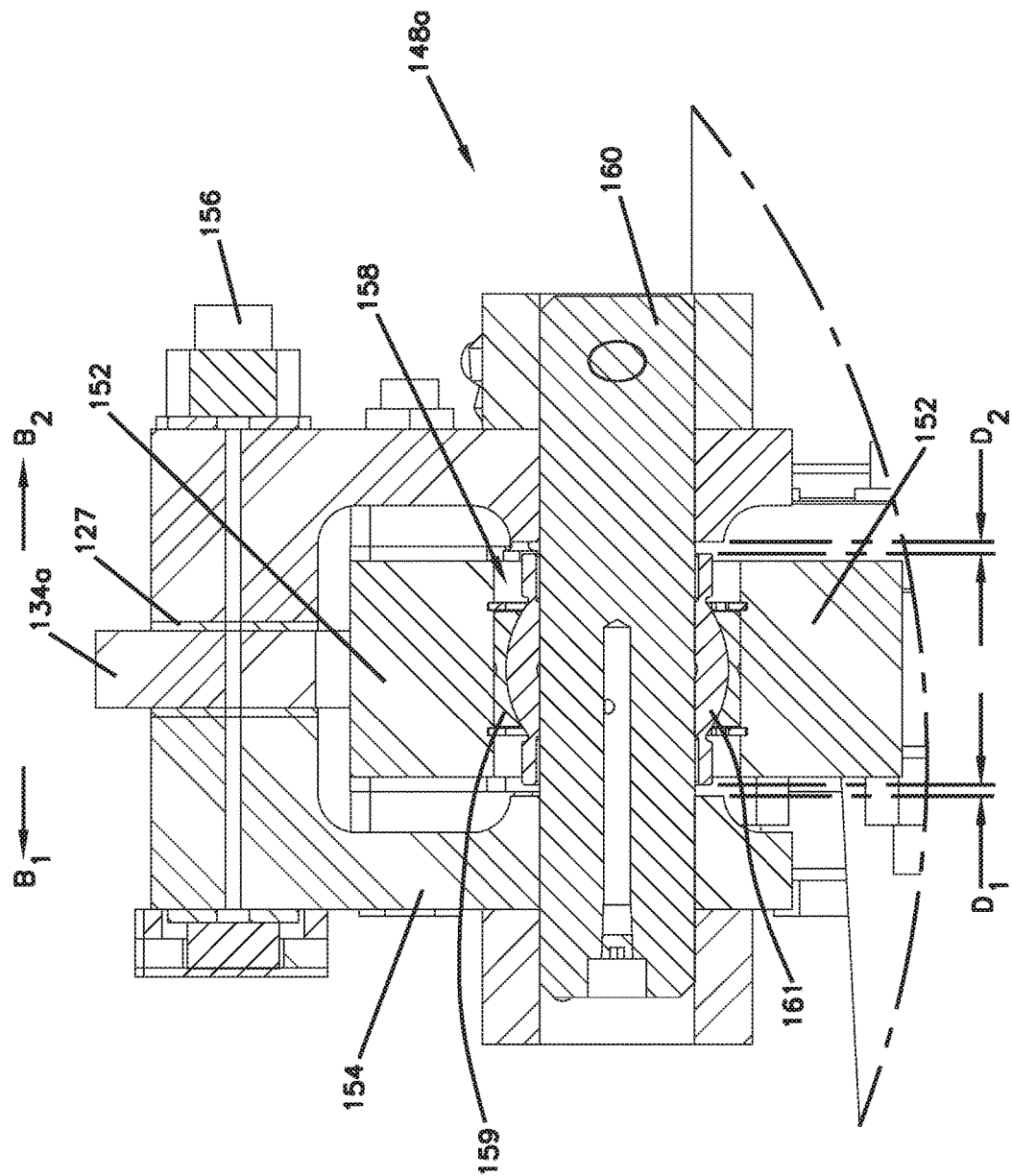
FIG. 14 illustrates a cross-section view of a portion of the motor mounting system of FIG. 8.

As noted with respect to FIG. 9, the pivotally flexible mounting interface 130a includes a plurality of spacers 127, 129 to allow the motor 126a to move in axial directions B1 and B2. Specifically, the spacers 127, 129 allow the bearings 158, 166 to move in axial directions B1 and B2. An example of such allowed movement is shown in FIG. 14. Bearing 158 is permitted to move in axial directions B1 and B2 a distance of D1 and D2 along the bearing pin 160. Such movement accounts for potential axial loading in the system that could originate from differences in tolerances or from misalignment in the frame mounting surfaces 134a, 134b. By allowing axial movement at a single pivotally flexible mounting interface 130a, stability of the entire system is increased. In some embodiments, flexible mounting interface 130b can also include spacers similar to the spacers 127, 129. However, such spacers in the flexible mounting interface 130b would have a width that is less than the width of spacers 127, 129.

Figure 15:
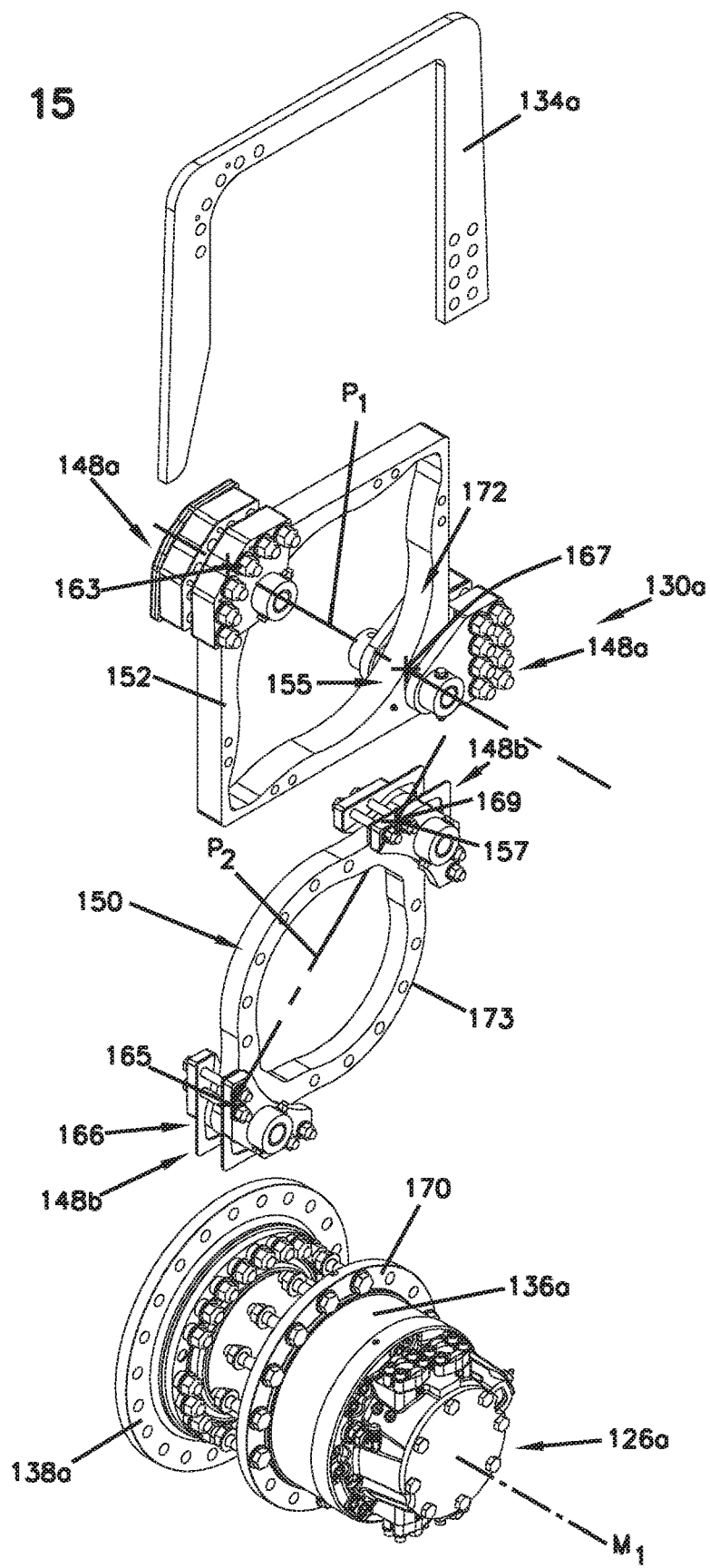
FIG. 15 illustrates an exploded view of the motor mounting system including only a single motor.

FIG. 15 shows an exploded view of the motor 126a, flexible mounting interface 130a, and the frame mounting surface 134a. As shown, it is noted that the intermediate plate 152 is manufactured with an inner cutout 172 that is shaped substantially similar to the outer shape 173 of the motor mounting plate 150. Once assembled, such shaping allows the first and second pairs of spherical connection joints 148a, 148b to be positioned in the same vertical plane, the vertical plane being generally perpendicular to the axis of rotation M1 of the motor 126a. While spherical connection joints have been shown and described herein for the flexible mounting interfaces 130a, 130b, any connection joint which provides for the desired multi-directional adjustment capability like the spherical connection joints 148a, 148b, disclosed herein, would be deemed to be within the scope of the present system.

As shown, the first pair of spherical connection joints 148a includes the first bearing 158 having the center 163, and a second bearing 155 having a center 167. The centers 163, 167 are connected by the pivot axis P1. Accordingly, the intermediate plate 152 is able to freely pivot about the pivot axis P1. Further, the second pair of spherical connection joints 148b includes the third bearing 166 having a center 165 and a fourth bearing 157 having a center 169. The centers 165, 169 are connected by the pivot axis P2 and the motor mounting plate 150 is free to pivot about axis P2. The pivot axis P2 is transverse to the pivot axis P1.

Figure 16:
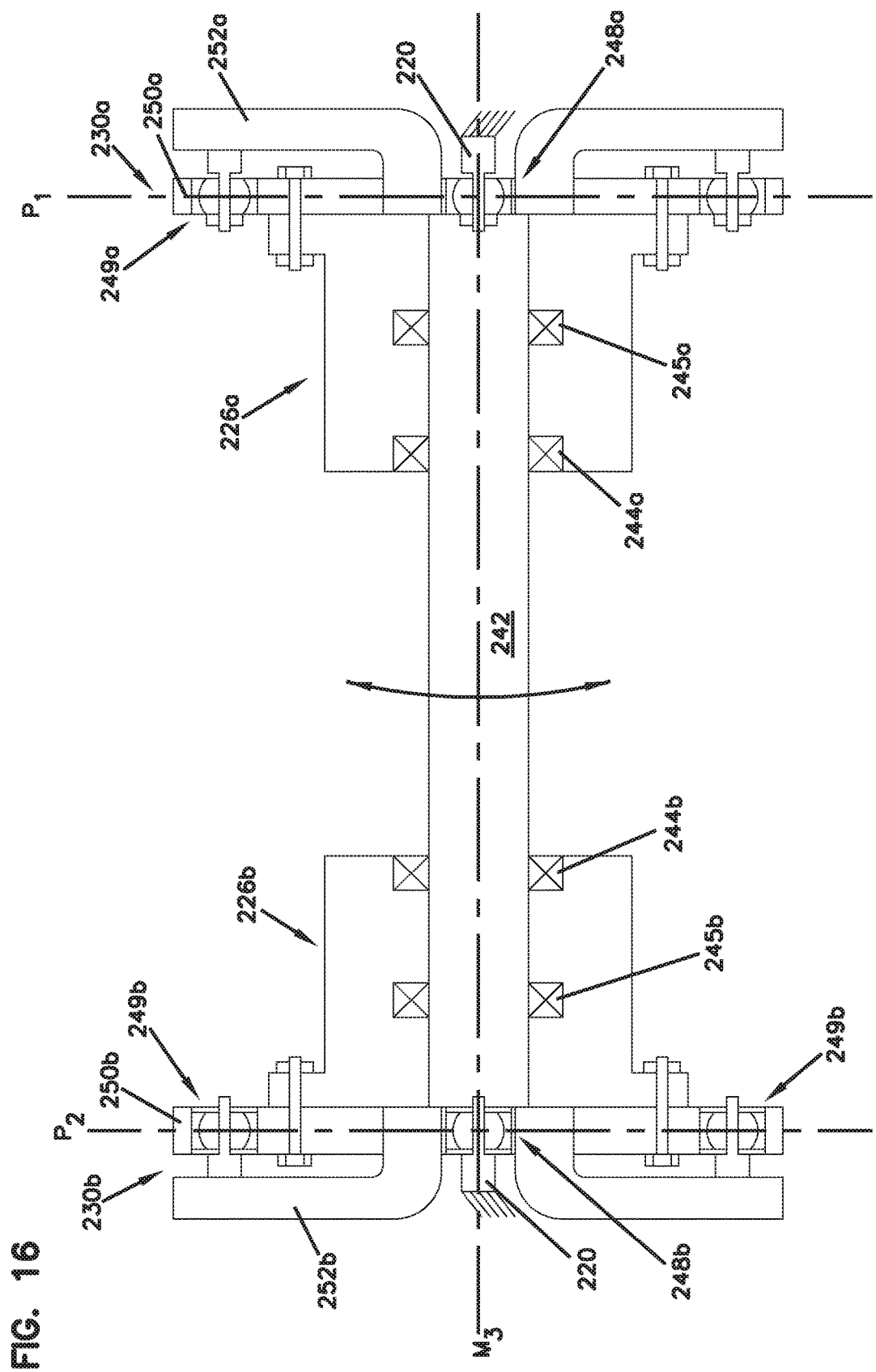
FIG. 16 illustrates a schematic example of pivotally flexible mounting interfaces for a rotatable shaft.

FIG. 16 shows a schematic example of flexible mounting interfaces 230a, 230b implemented to support and align and rotating shaft 242. At either end of the rotating shaft 242, shaft supports 226a, 226b are positioned to rotationally support the shaft 242. The shaft supports 226a, 226b each include a pair of bearings 244a/245a, 244b/245b. The shaft supports 226a, 226b are further attached to the flexible mounting interfaces 230a, 230b. A frame structure 220 is further attached to the flexible mounting interfaces 230a, 230b.

The flexible mounting interfaces 230a, 230b each include a first pair of spherical connection joints 248a/248b, a second pair of spherical connection joints 249a/249b, a motor mounting plate 250a/250b, and intermediate plate 252a/252b. As shown, the first pair of spherical connection joints 248a/248b is positioned within the intermediate plates 252a/252b and connected to the frame structure 220. In the view shown, the first pair of spherical connection joints 248a/248b of each flexible mounting interface 230a, 230b is stacked, and, therefore, one spherical connection joint of the pair 248a/248b is hidden behind the other. The second pair of spherical connection joints 249a/249b is shown positioned within the mounting plates 250a/250b and also attached to the intermediate plate 252a/252b. Further, the mounting plates 250a/250b are attached to the shaft supports 226a/226b.

As shown, the first pair of spherical connection joints 248a/248b and second pair of spherical connection joints 249a/249b of each flexible mounting interface 230a, 230b are aligned within vertical reference planes P1 and P2. The first and second spherical connections joints 248a/249a, 248b/249b also allow the shaft supports 226a, 226b to move/pivot about the frame structure 220 so as to align an axis of rotation M3 of the shaft 242 with the centerlines of the bearings 244a/245a, 244b/245b. Further, the shaft support 226b is allowed to move in the axial direction, parallel to the axis if rotation M3. Axial movement is made possible by the first and second spherical connections joints 248b, 249b being able to move in the axial directions within the flexible mounting interface 230b. The pairs of spherical connection joints 248a/248b are moveably connected to the support structure 226a and to the frame structure 220.

FIG. 17 shows the flexible mounting interface 230b mounted to the shaft support 226b. As shown, the rotating shaft 242 is supported at one end by the shaft support 226b, and at an opposite end by a simple support 280. In some embodiments, the simple support 280 is a self-aligning spherical bearing that includes an inner race 282 that is secured to the rotating shaft 242, and an outer race 284 that is connected to the frame structure 220.

FIG. 18 shows the flexible mounting interface 230b attached directly to a bearing 286. In some embodiments, the bearing 286 is a cylindrical bearing. Similar to the shaft supports 226a/226b described above, the bearing 286 is attached to the mounting plate 250b, specifically an outer race 288 of the bearing 286 is attached to the mounting plate 250b, while an inner race 290 is secured to the shaft 242.

At the opposite side of the shaft 242 from the bearing 286, the shaft support 226a is fixedly secured to the frame structure 220. Therefore, the flexible mounting interface 230b allows the bearing 286 to move so as to align the shaft axis M3 in the system so that excessive loads do not build up within the components.

While some of embodiments describe mounting a motor, or motors to a rock wheel, the motor mounting system disclosed herein can also be used in a variety of other applications where a drive motor is mounted to a rotating structure. Examples of other applications that the disclosed motor mounting system could be applied in could include cutter drums, mills, saws, pulley/conveyor drives, winch drives, etc. More generally, the current disclosure may be utilized in systems where bearings along a rotating shaft receive loads from a rotating structure from which the drive shaft is attached. Specifically relevant are applications where two motors are used to drive a rotating structure, or in applications where a single motor is used to drive a rotating structure and there is a need for additional support on the opposite side of the rotating structure from the single motor. Still other relevant applications include applications that require a rigid connection between a motor, a rotating structure, and a mounting surface.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

I claim:

1. A rotary apparatus, comprising:
    a boom configured to be pivotally attached to a vehicle by a connection that allows the boom to be pivoted between raised and lowered positions, the boom defining a fixed mount flange; and
    a first motor having a first motor housing mounted to the first fixed mount flange of the boom via a first pivotally flexible mounting interface, the first motor having a first drive shaft rotatably mounted within the first motor housing, the first drive shaft defining a first motor axis, and the first motor also having a first rotary mount flange;
    wherein the first pivotally flexible mounting interface used to mount the first motor housing to the first fixed mount flange includes spherical connection joints, the spherical connection joints being movably connected to the first motor housing and to the first fixed mount flange, the spherical connection joints further allowing the first motor housing to move with respect to the first fixed mount flange; and
    wherein the first pivotally flexible mounting interface comprises:
        a motor mounting plate rigidly mounted to the first motor housing of the first motor; and
        an intermediate mounting plate;
        wherein the motor mounting plate is pivotally flexibly mounted to the intermediate mounting plate at a first spherical plain bearing having a first center and at a second spherical plain bearing having a second center so that the motor mounting plate is free to pivot about a first mount axis;
        wherein the intermediate mounting plate is pivotally flexibly mounted to the first fixed mount flange at a third spherical plain bearing having a third center and at a fourth spherical plain bearing having a fourth center so that the intermediate mounting plate is free to pivot about a second mount axis that is transverse to the first mount axis; and
        wherein the intermediate mounting plate includes an inner cutout that is sized and shaped substantially similar to an outer shape of the motor mounting plate, and wherein the motor mounting plate is positioned within the inner cutout of the intermediate mounting plate.

2. The rotary apparatus of claim 1, wherein the first pivotally flexible mounting interface is configured to allow the first motor housing to move in a direction that is parallel with a shaft axis.

3. The rotary apparatus of claim 1, further comprising a rotary component having a component axis, the rotary component being mounted at a first side to the first rotary mount flange of the first motor, the rotary component being operably connected to the first drive shaft.

4. The rotary apparatus of claim 3, wherein the spherical connection joints are configured to allow the first motor housing to move so as to align the first motor axis with the component axis of the rotary component.

5. The rotary apparatus of claim 3, wherein the boom further comprises a second fixed mount flange, the rotary apparatus further comprising a second motor having a second motor housing mounted to the second fixed mount flange via a second pivotally flexible mounting interface, the second motor also having a second drive shaft rotatably mounted within the second motor housing, the second drive shaft of the second motor defining a second motor axis, the second motor having a second rotary mount flange, and wherein the first and second pivotally flexible mounting interfaces are configured to allow the respective first and second motor housings to move so as to respectively align the first and second motor axes of a corresponding first and second motor with the component axis of the rotary component.

6. The rotary apparatus of claim 5, further comprising a rock wheel rotatable relative to the boom about a rock wheel rotation axis, the rock wheel being attached at a first major side to the first fixed mount flange and at a second major side to the second fixed mount flange, the rock wheel further having an outer periphery that extends around the rock wheel rotation axis, the rock wheel also including a plurality of excavating teeth mounted at the outer periphery of the rock wheel, wherein the distance between the first fixed mount flange and the second fixed mount flange is less than a diameter of the rock wheel.

7. The rotary apparatus of claim 1, further comprising a rock wheel rotatable relative to the boom about a rock wheel rotation axis, the rock wheel being attached at a first major side to the first fixed mount flange, the rock wheel further having an outer periphery that extends around the rock wheel rotation axis, the rock wheel also including a plurality of excavating teeth mounted at the outer periphery of the rock wheel.

8. The rotary apparatus of claim 1, wherein the first flexible mounting interface includes first and second pairs of spherical connection joints, wherein a first reference plane bisects the first pair of spherical connection joints and a second reference plane bisects the second pair of spherical connection joints, and wherein the first and second reference planes are generally perpendicular to one another, and wherein a connection joint reference plane bisects the first and second pairs of spherical connection joints of the first flexible mounting interface.

9. The rotary apparatus of claim 1, wherein the first flexible mounting interface includes a first pair of spherical connection joints aligned along a first pivot axis and a second pair of spherical connection joints aligned along a second pivot axis, the first and second pivot axes being generally transverse relative to one another.

10. The rotary apparatus of claim 1, wherein the first pivotally flexible mounting interface is configured to allow the first drive shaft to move in an axial direction.

11. The rotary apparatus of claim 1, wherein the spherical connection joints comprise spherical bushings.

12. A rotary apparatus, comprising:
a carrier defining a fixed mount flange; and
a support structure mounted to the fixed mount flange via a pivotally flexible mounting interface;
wherein the pivotally flexible mounting interface comprises:
   a support structure mounting plate rigidly mounted to, or part of, the support structure; and
   an intermediate mounting plate, the intermediate mounting plate including an inner cutout that is sized and shaped substantially similar to an outer shape of the support structure mounting plate, and wherein the support structure mounting plate is positioned within the inner cutout of the intermediate mounting plate;
wherein the support structure mounting plate is pivotally flexibly mounted to the intermediate mounting plate at a first spherical plain bearing having a first center and at a second spherical plain bearing having a second center so that the support structure mounting plate is free to pivot about a first mount axis; and
wherein the intermediate mounting plate is pivotally flexibly mounted to the fixed mount flange at a third spherical plain bearing having a third center and at a fourth spherical plain bearing having a fourth center so that the intermediate mounting plate is free to pivot about a second mount axis that is transverse to the first mount axis.

13. The rotary apparatus of claim 12, wherein the support structure comprises a rotatably mounted shaft.

14. The rotary apparatus of claim 12, wherein the support structure comprises a housing and a bearing.

15. The rotary apparatus of claim 12, wherein the carrier is a boom of a trencher machine, and wherein the support structure is a motor housing of a motor.

16. A trenching device adapted for attachment to a vehicle, the trenching device comprising:
a boom configured to be pivotally attached to the vehicle by a connection that allows the boom to be pivoted between raised and lowered positions, the boom having a fixed mount flange;
a shaft mounted to the fixed mount flange of the boom via a pivotally flexible mounting interface, the shaft being rotatably mounted relative to a structural component by a plurality of shaft bearings, the shaft defining a shaft axis and having a rock wheel mounting flange; and
a rock wheel rotatable relative to the boom about a rock wheel rotation axis, the rock wheel being attached at a first major side to the rock wheel mounting flange such that the rock wheel rotates with the shaft, the rock wheel further having an outer periphery that extends around the rock wheel rotation axis, the rock wheel also including a plurality of excavating teeth mounted at the outer periphery of the rock wheel;
wherein the pivotally flexible mounting interface includes a universal pivot arrangement, the universal pivot arrangement being configured to allow a structural component to universally pivot relative to the boom to accommodate misalignment between the shaft axis and the rock wheel rotation axis, the universal pivot arrangement including a first pair of spherical connection joints aligned along a first pivot axis and a second pair of spherical connection joints aligned along a second pivot axis, the first and second pivot axes being generally perpendicular relative to one another, the pivotally flexible mounting interface including a component mounting plate and an intermediate plate, the component mounting plate being attached to the structural component and the intermediate plate being coupled to the component mounting plate by the first pair of spherical connection joints, and wherein the intermediate plate is coupled to the boom by the second pair of spherical connection joints.

17. The trenching device of claim 16, wherein the structural component includes a motor housing of a motor for driving rotation of the rock wheel, and wherein the shaft is a drive shaft.

18. The trenching device of claim 16, wherein the pivotally flexible mounting interface is configured to allow the shaft to move in an axial direction.

* * * * *